(12) United States Patent
Yamamoto et al.

(10) Patent No.: US 7,188,403 B2
(45) Date of Patent: Mar. 13, 2007

(54) MANUFACTURING METHOD OF ARMATURE COMPRISING CORE CONSTITUTED BY ASSEMBLING SPLIT CORE MEMBERS

(75) Inventors: Toshio Yamamoto, Kosai (JP);
Masayuki Kuwano, Kosai (JP);
Yasuhide Ito, Shizuoka-ken (JP);
Yoshiki Nakano, Hamamatsu (JP)

(73) Assignee: Asmo Co., Ltd., Shikuoka-ken (JP)

( * ) Notice: Subject to any disclaimer, the term of this patent is extended or adjusted under 35 U.S.C. 154(b) by 0 days.

(21) Appl. No.: 11/036,198

(22) Filed: Jan. 13, 2005

(65) Prior Publication Data

US 2005/0206264 A1   Sep. 22, 2005

(30) Foreign Application Priority Data

| Jan. 13, 2004 | (JP) | 2004-005940 |
| Jul. 28, 2004 | (JP) | 2004-220407 |
| Jul. 28, 2004 | (JP) | 2004-220408 |

(51) Int. Cl.
*H02K 15/08* (2006.01)
*H02K 15/095* (2006.01)

(52) U.S. Cl. ............... 29/605; 29/596; 29/598; 310/264; 310/269

(58) Field of Classification Search ............ 29/605, 29/606, 596–598; 310/218, 216, 261, 264, 310/269
See application file for complete search history.

(56) References Cited

U.S. PATENT DOCUMENTS

| 2,501,232 A | * | 3/1950 | Mesh | .......................... 310/269 |
| 6,624,541 B2 | * | 9/2003 | Horng et al. | .................. 310/45 |
| 2002/0121831 A1 | * | 9/2002 | Egawa et al. | ............... 310/216 |
| 2004/0124737 A1 | * | 7/2004 | Yamamoto et al. | ......... 310/269 |

FOREIGN PATENT DOCUMENTS

| JP | 63-187545 | 12/1988 |
| JP | 09-046941 | 2/1997 |
| JP | 09-322441 | 12/1997 |
| JP | 2002-291183 | 10/2002 |
| JP | 2002-369421 | 12/2002 |
| JP | 2003-116248 | 4/2003 |

* cited by examiner

*Primary Examiner*—Peter Vo
*Assistant Examiner*—Livius R. Cazan
(74) *Attorney, Agent, or Firm*—Patterson, Thuente, Skaar & Christensen, P.A.

(57) ABSTRACT

The armature of a motor comprises a core constituted by assembling a plurality of split core members. Each split core member has at least two teeth. The method for manufacturing the armature comprises the steps of: winding a conductive wire on each tooth of each split core member to form a first coil on the teeth; spanning the conductive wire extending from a winding finishing end of the first coil from each tooth to the other tooth; winding the conductive wire on the tooth to which the conductive wire is spanned to form a second coil on the first coil; joining a winding starting end of the first coil and a winding finishing end of the second coil in each tooth to form a single coil; and mutually assembling the plurality of split core members each comprising the coils. As a result, productivity is improved, while reducing size.

16 Claims, 22 Drawing Sheets

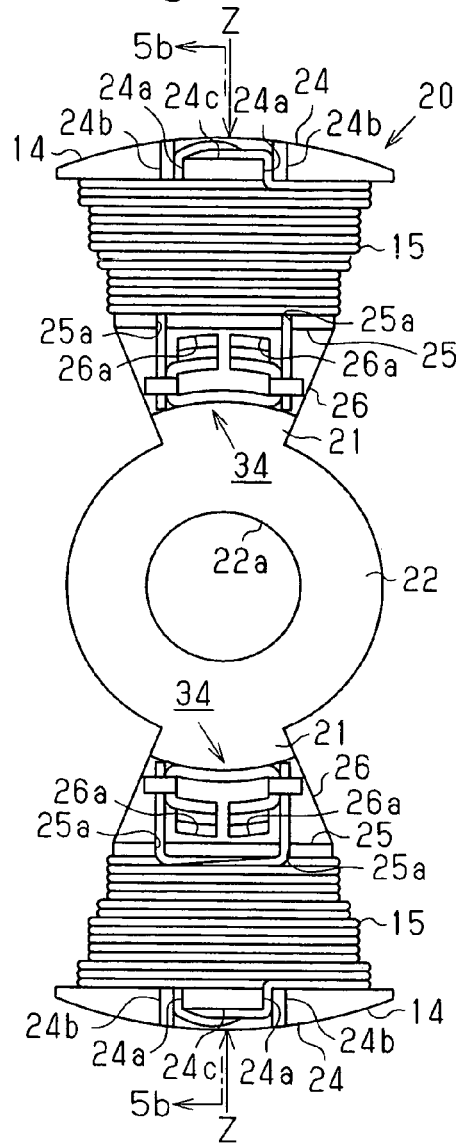
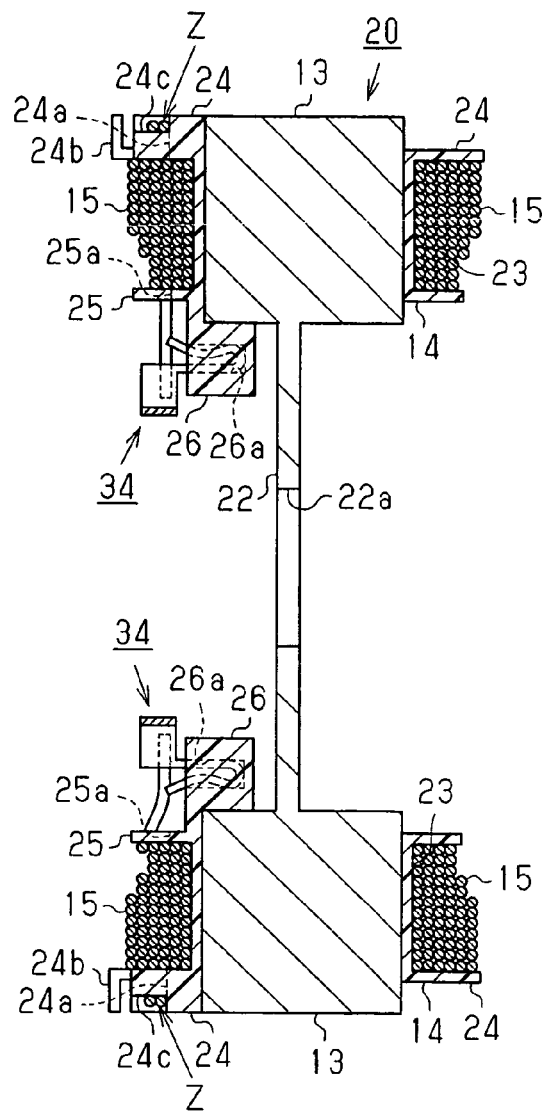
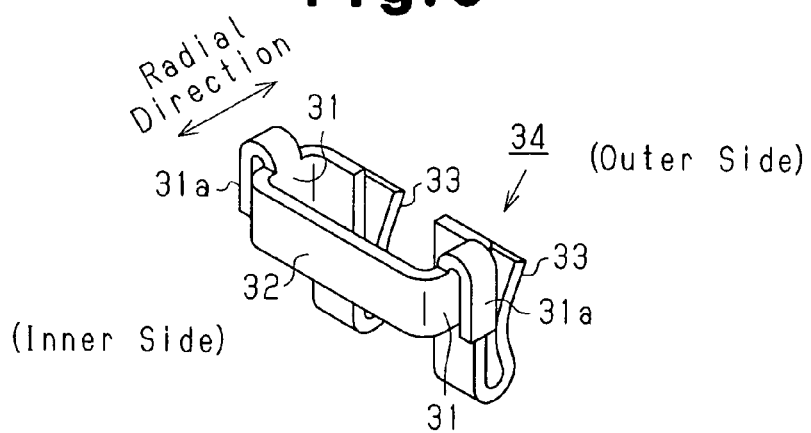

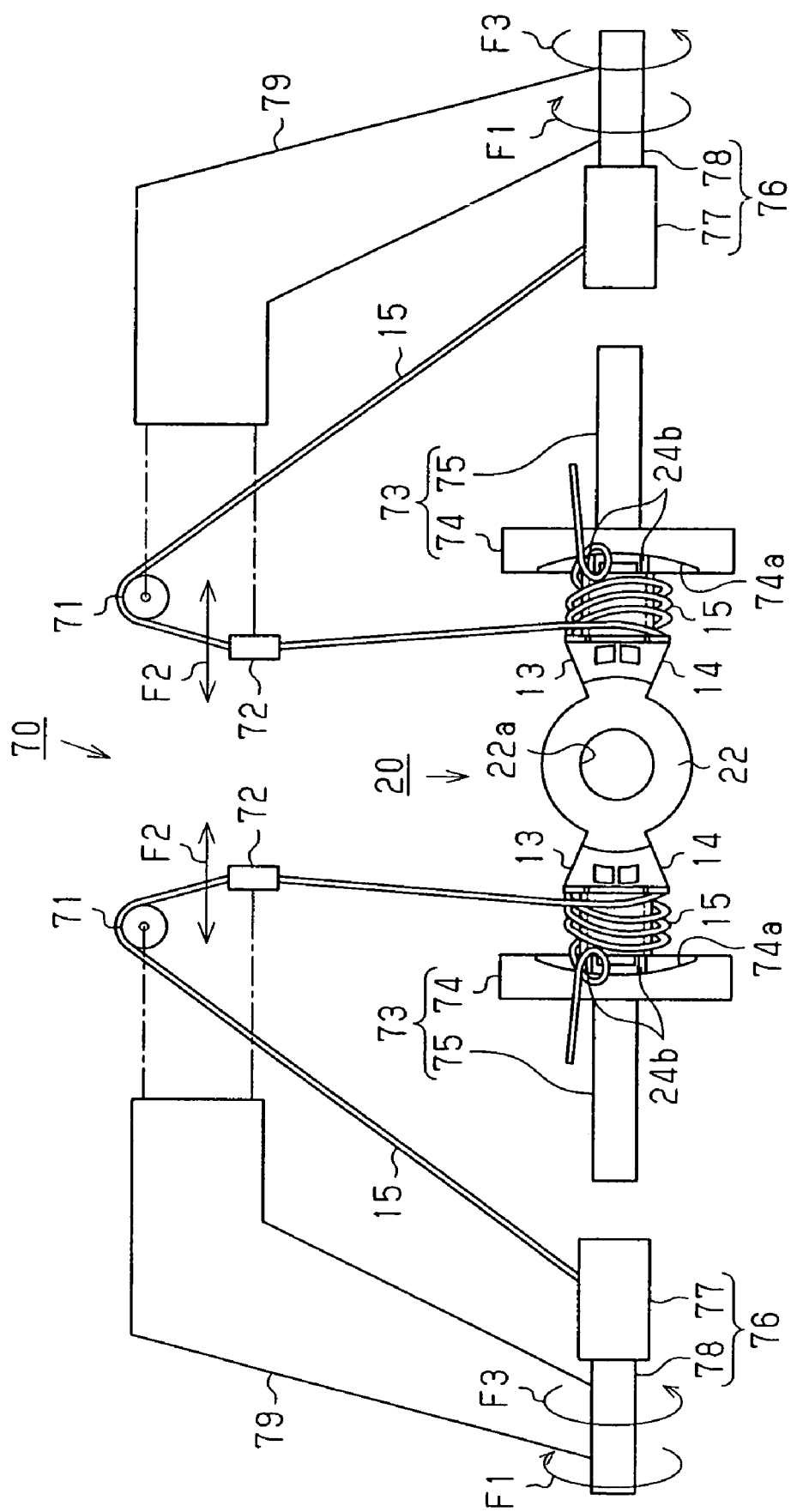

MANUFACTURING METHOD OF ARMATURE COMPRISING CORE CONSTITUTED BY ASSEMBLING SPLIT CORE MEMBERS

BACKGROUND OF THE INVENTION

The present invention relates to a method for manufacturing an armature, a method for manufacturing a motor, and an armature.

In general, the armature in an electrical machine with rotating parts, such as a motor, has a core that has radially arranged teeth. A coil is wound about each tooth. In the armature having such a core, various configurations have been proposed directed to space factors. For example, a core has been proposed, which is constituted by combining a plurality of split core members having an annular portion and at least one tooth radially extending from the annular portion (see Japanese Laid-Open Patent Publication No. 9-46941, Japanese Laid-Open Utility Model Publication No. 63-187545, Japanese Laid-Open Patent Publication No. 9-322441, Japanese Laid-Open Patent Publication No. 2002-291183, and Japanese Laid-Open Patent Publication No. 2002-369421). In such cores, after winding a coil on the teeth of each split core member, those split core members can be mutually assembled. Hence, without being hindered by adjacent teeth, a coil can be wound about each tooth, thereby forming the armature having a high space factor.

In the meantime, the manufacturing process for the motor, after having wound a coil on each tooth, includes a process of pressing the armature and a commutator into a rotary shaft, and connecting the end portion of each coil to the commutator. However, in general, the coil used for the motor comprises a relatively soft wire such as a thin copper wire, and is unable to maintain its shape by itself. Hence, after having wound the coil on each tooth, if its end portion is let loose once, it becomes difficult to grip the end portion again when attempting to connect it to the commutator in a process in which an assembly is automated, thereby bringing about a deterioration of productivity. Hence, it is necessary to hold the end portion of the coil during the time from the coil is wound about each tooth till the end portion of each coil is connected to the commutator. However, if the mechanism to hold the end portion of the coil is provided in the armature, the size of the motor is increased.

SUMMARY OF THE INVENTION

An objective of the present invention is to provide a method for manufacturing an armature, a method for manufacturing a motor, and an armature, which improve productivity, while reducing size.

To achieve the above described objects, the present invention provides a method for manufacturing an armature comprising a core which is constituted by assembling a plurality of split core members. Each split core member has at least two teeth and a joining member to join these teeth. The above described method comprises: a first winding step of winding a conducting wire on each tooth of each split care member to form on the tooth a first coil having a winding starting end and a winding finishing end; a spanning step of spanning the conductive wire extending from the winding finishing end of the first coil from each tooth to the other toot; a second winding step of winding the conductive wire on the tooth to which the conductive wire is spanned to form on the first coil a second coil having a winding starting end and a winding finishing end; a wire connecting step of joining the winding staffing end of the first coil and the winding finishing end of the second coil in each tooth so as to form a single coil; and a core assembling step of mutually assembling the plurality of split core members with each comprising the coils.

The present invention further provides a method for manufacturing an armature comprising cores constituted by assembling a plurality of split core members. Each split core member has at least two teeth and a joining member to join these teeth. This method comprises: a step of engaging an end portion of a conductive wire on an outer region in a radial direction of each tooth in each split core member; a spanning step of spanning the conductive wire from each tooth to the other tooth; a winding step of winding the conductive wire on the tooth to which the conductive wire is spanned to form on the tooth a coil having a winding starting end and a winding finishing end; a wire connecting step of joining the end portion of the conductive wire engaged with the outer region in a radial direction of each tooth and the winding finishing end of the coil in each tooth; and a core assembling step of mutually assembling the plurality of split core members with each comprising the coils.

The present invention further provides an armature suitably used for a motor. The armature comprises a core, which is constituted by assembling a plurality of split core members. Each split core member has two teeth disposed at angular intervals of 180 degrees. When the core members are assembled, the teeth are radially disposed. The armature further comprises: coils each wound about one of the teeth; a commutator for rectifying current supplied to the coils; and a rotary shaft on which the core and the commutator are fixed. Each split core member has an annular portion and two joining portions each corresponding to one of the teeth. Each joining portion extends to the inner side in a radial direction from a region of the corresponding tooth other than one end in an axial direction of the tooth. The annular portion is joined with the joining portions and receives the rotary shaft. The split core members are assembled so that the annular portions are stacked in a state disposed coaxially. The positions in an axial direction of the joining portions and the annular portions are different in relation to the teeth for every split core member, such that the positions in an axial direction of all the teeth are matched in a state in which the split core members are assembled.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

FIG. 5(a) is a plan view for explaining a manufacturing process for the armature in the motor of FIG. 1;

FIG. 5(b) is a cross-sectional view taken along line 5b—5b of FIG. 5(a);

FIG. 6 is a perspective view of a terminal joining unit;

FIGS. 8 to 11(b) are perspective views for explaining the manufacturing process for the armature;

FIG. 25 is a schematic diagram of a conductive wire winding device according to a third embodiment of the present invention;

DETAILED DESCRIPTION OF THE PREFERRED EMBODIMENTS

A first embodiment according to the present invention will be described in accordance with FIGS. 1 to 19.

Figure 1:
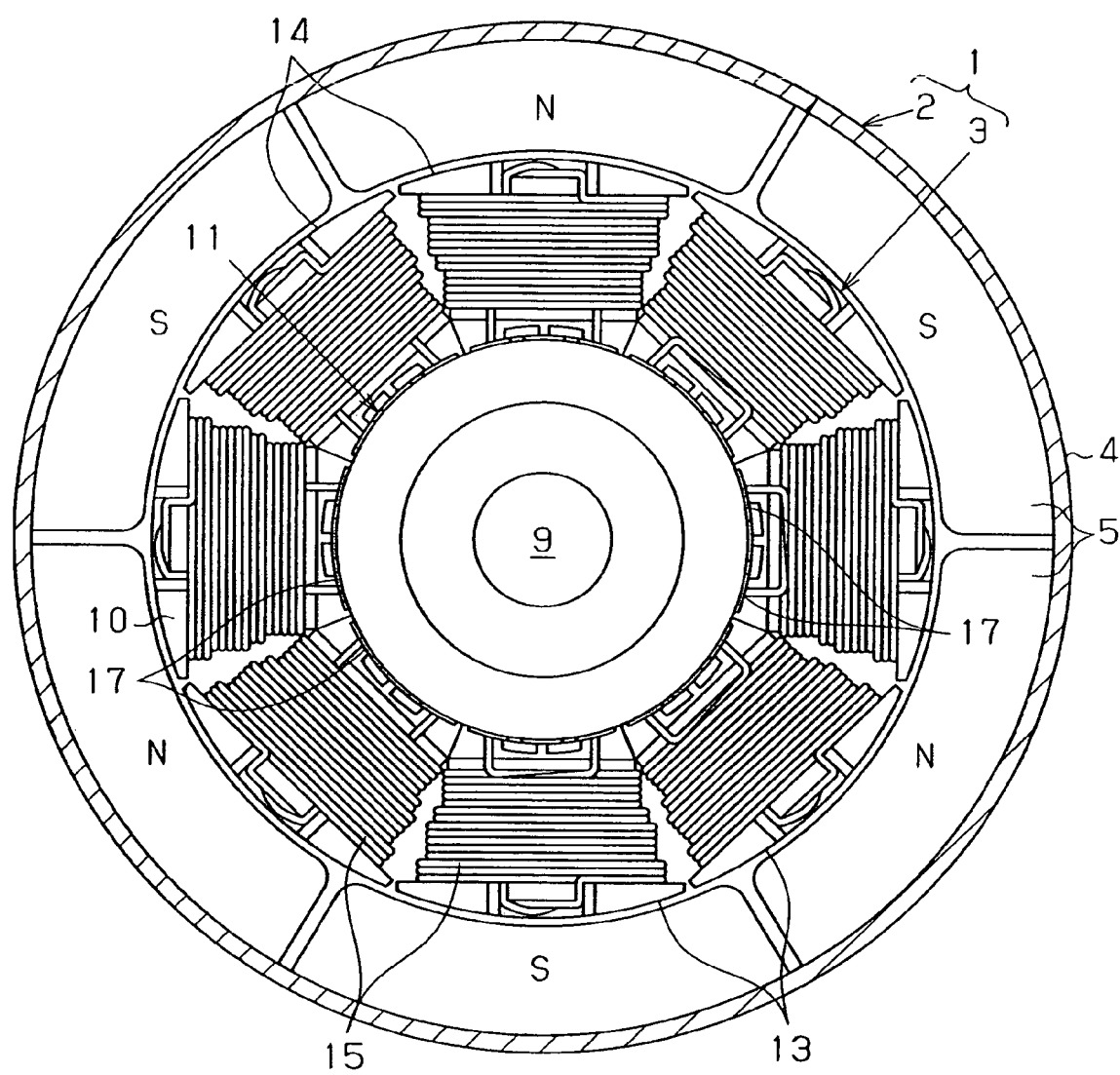
FIG. 1 is a schematic diagram of a motor according to a first embodiment of the present invention.
Figure 2:
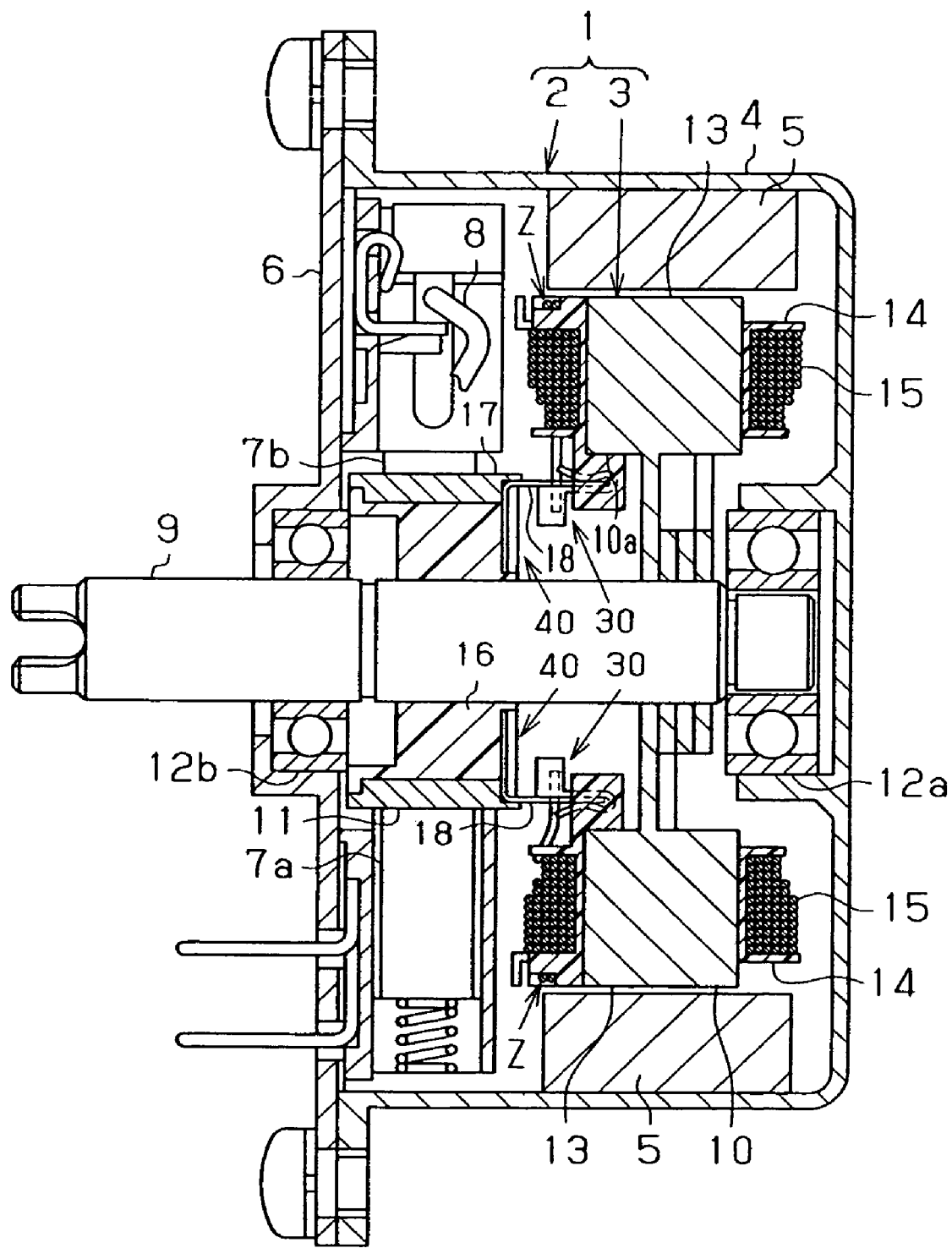
FIG. 2 is a cross-sectional view of the motor of FIG. 1.

As shown in FIGS. 1 and 2, a DC motor 1 with brushes according to the present embodiment comprises a stator 2 and an armature 3, which is a rotator.

The stator 2 comprises a substantially cylindrical yoke housing 4 with one end blocked, and a plurality (six pieces in the present embodiment) of permanent magnets 5 fixed to the inner peripheral surface of the yoke housing 4. The permanent magnets 5 are disposed around the axis of the yoke housing 4 at equal angular intervals so as to become alternately heteropolar in a circumferential direction. An end frame 6 is fixed to an opening end of the yoke housing 4 so as to block the opening of the yoke housing 4. The end frame 6 is held with an anode supply brush 7a and a cathode supply brush 7b. The anode supply brush 7a and the cathode supply brush 7b are connected to a power supply terminal 8.

The armature 3 comprises a rotary shaft 9, an armature core 10 fixed to the rotary shaft 9, and a commutator 11 similarly fixed to the rotary shaft 9. The rotary shaft 9 is rotatably supported by bearings 12a provided in the center of the bottom of the yoke housing 4 and by bearings 12b provided in the center of the end frame 6. The cores 10 are opposed to the permanent magnets 5 and surrounded by the permanent magnets 5.

The core 10 has a plurality (eight pieces in the present embodiment) of teeth 13 radially extending with the rotary shaft 9 as a center. A coil 15 is wound about each tooth 13 through a bobbin 14. The end surface of the core 10 which confronts the commutator 11 is provided with a plurality of terminals 30 as a second contact portion to which the end portion of the coil 15 wound about the teeth 13 is connected.

The commutator 11 comprises a substantially cylindrical insulator 16 and a plurality (24 pieces in the present embodiment) of segments 17 which are disposed on the outer peripheral surface of the insulator 16 in a circumferential direction at equal angular intervals. The anode supply brush 7a and the cathode supply brush 7b are opposed to the outer peripheral surface of the commutator 11 so as to slidably contact the segment 17.

Figure 3:
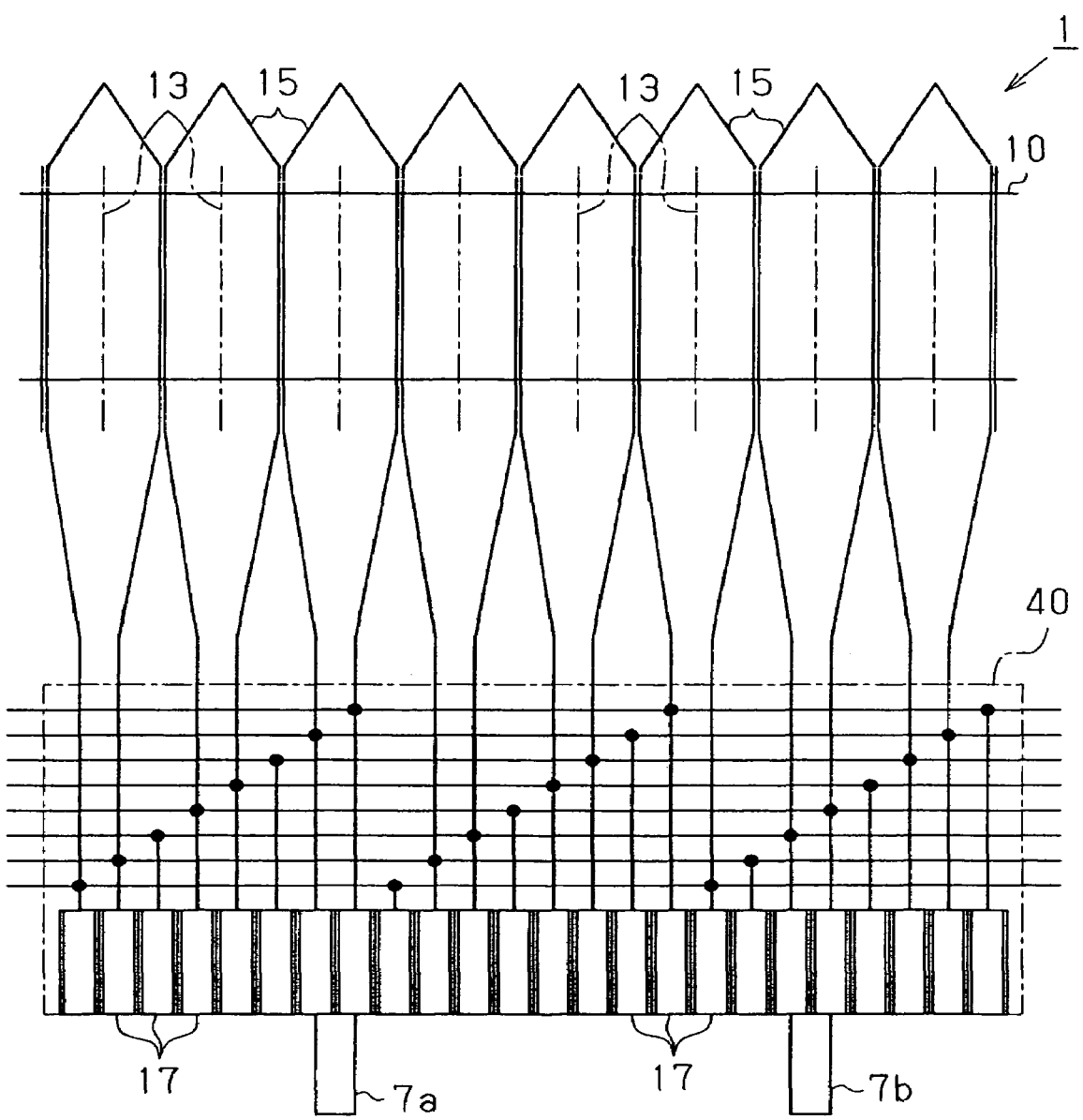
FIG. 3 is a view showing a developed state in plan view of an armature in the motor of FIG. 1.

The end surface of the commutator 11 confronting the core 10 is provided with a short-circuit member assembly 40 which is constituted as a single assembly. The short-circuit member assembly 40 allows a plurality (three pieces in the present embodiment) of the segments 17 to be mutually shorted so as to be at the same electrical potential. The motor 1 of the present embodiment is a so-called six-pole eight-slot type motor, which has six magnetic poles and eight teeth 13. In such a motor, as shown in FIG. 3, the short-circuit member assembly 40 allows three segments 17 disposed at intervals of eight pieces to be mutually shorted out of twenty-four pieces of the segment 17.

As shown in FIG. 2, the short-circuit member assembly 40 comprises a plurality of terminal pins 18 as a first contact portion which extends in an axial direction of the motor 1 toward the core 10 so as to be inserted into the terminal 30. With this terminal pin 18 inserted into the terminal 30, the short-circuit member assembly 40 is electrically connected to the terminal 30. The electrical power supplied from the anode supply brush 7a and the cathode supply brush 7b is supplied to the coil 15 through the segment 17, the short-circuit member assembly 40 and the terminal 30, and thereby the rotary shaft 9 is rotated together with the armature 3 relative to the stator 2.

Figure 4:
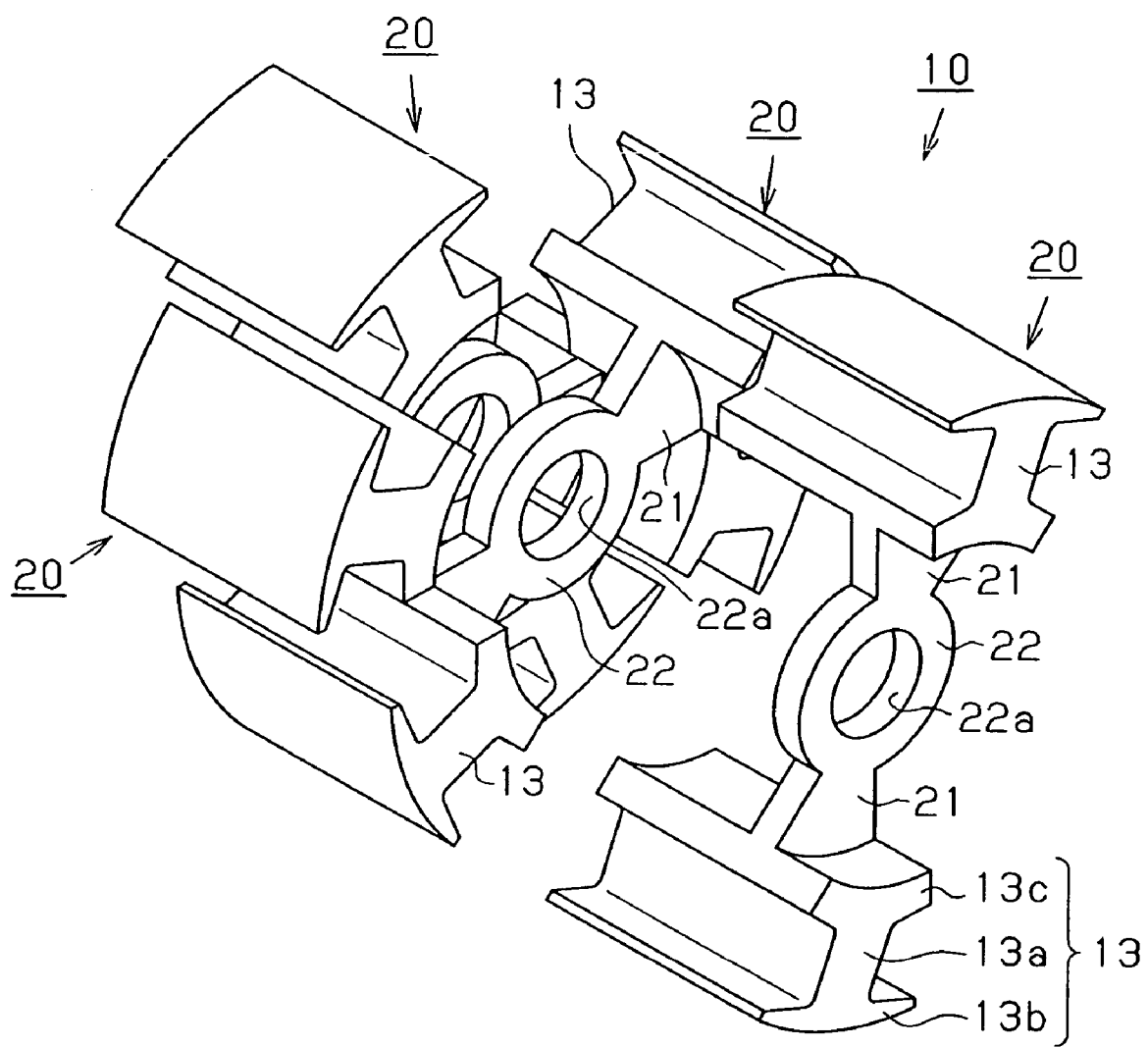
FIG. 4 is an exploded perspective view of a core in the motor of FIG. 1.

The above described core 10, as shown in FIG. 4, is formed by assembling a plurality (four pieces in the present embodiment) of split core members 20 in an axial direction. Each split core member 20 has an annular portion 22, a pair of joining portions 21 extending in a radial direction from the annular portion 22, and a pair of teeth each joined with the outer end in a radial direction of the joining portion 21. The joining portion 21 and the annular portion 22 constitutes a joining member, and has a thickness smaller than the teeth 13 with regard to the axial direction of the core 10. The joining portion 21 extends from a place other than both ends in an axial direction of the teeth 13. Further, in the present embodiment, in each split core member 20, two teeth 13 are disposed at positions spaced apart by 180 degrees. The annular portion 22 has a through hole 22a in which the rotary shaft 9 is inserted. When all the split core members 20 are assembled, the positions in an axial direction of the joining portion 21 and the annular portion 22 for the teeth 13 are different for every split core member 20, so that the positions in an axial direction of all the teeth 13 are matched (see FIGS. 2 and 14).

Each tooth 13 comprises a pole portion 13*a* about which the coil 15 is wound, an umbrella portion 13*b* formed outside in a radial direction of the pole portion 13*a*, and a restricting portion 13*c* formed inside in a radial direction of the pole portion 13*a*. The umbrella portion 13*b* extends both sides in a circumferential direction from the outside end in a radial direction of the pole portion 13*a*, and performs the stopping of falling off outside in a radial direction of the coil 15. The restricting portion 13*c* extends from the inner side in a radial direction of the pole portion 13*a* to both sides in a circumferential direction so as to have an angular range of 45 degrees. When the four split core members 20 are assembled, the adjacent restricting portions 13*c* of the teeth 13 are allowed to abut against each other in a circumferential direction. The pole portion 13*a*, the umbrella portion 13*b*, and the restricting portion 13*c* have the same thickness in an axial direction.

The four split core members 20 are assembled such that a total of eight teeth 13 are disposed radially at equal angular intervals and four annular portions 22 are stacked coaxially (see FIGS. 2 and 14), thereby forming the core 10. Since the joining portion 21 and the annular portion 22 are disposed at a place other than one end in an axial direction in the teeth 13, a place corresponding to the joining portion 21 and the annular portion 22 of one end side in the axial direction of the core 10 has a recess 10*a* (see FIGS. 2 and 14).

Prior to the assembly of the four split core members 40, as shown in FIGS. 5(*a*) and 5(*b*), the coil 15 is wound about each tooth 13 of each split core member 20 through the bobbin 14. The coils 15 are wound by way of concentrated winding. The bobbins 14 are formed of resin, and by being disposed between the teeth 13 and the coil 15, function as an insulator.

Each bobbin 14 comprises a tubular portion 23 about which the coil 15 is wound, an outer collar portion 24 provided at the end portion outside the tubular portion 23, and an inner collar portion 25 provided at the end portion inside the tubular portion 23. A setting portion 26 extends from the inner color portion 25 to the inner side in a radial direction, and as shown in FIG. 2, is disposed between the joining members (21 and 22) and the commutator 11 in a state in which the motor 1 is assembled.

The outer collar portion 24 has two engaging grooves 24*a* (outer engaging grooves) engaged with the end portion of the coil 15. Outside the two engaging grooves 24, there are provided protruded portions (outer protruded portions) 24*b*, and between the two engaging grooves 24*a*, there are formed notched portions 24*c* notched from the outer peripheral side. In the inner collar portions 25, there are formed two engaging grooves 25*a* (inner engaging grooves), which are engaged with the end portions of the coils 15. The setting portion 26 has two accommodating recesses 26*a*, which are open in the surface confronting the commutator 11. These two accommodating recesses 26*a* receive portions of the terminal joining units 34 as second contact portion joining units in an axial direction. The terminal joining unit 34 is composed of two terminals 30 joined together, and is a unit at a stage before being split into two terminals 30 in the manufacturing process of the motor 1.

The above described terminal joining unit 34 is formed of a metallic plate, and is curved so as to be opened toward the outside of the split core member 20 in a radial direction in a state provided in the setting portion 26 of the bobbin 14. In more detail, as shown in FIG. 6, each terminal joining unit 34 comprises two sidewall portions 31, and a joining portion 32 for joining these sidewall portions 31. The joining portion 32 is cut in the center, and a part of that portion is removed, so that two terminals 30 can be obtained. Wire connection claws 31*a* extend from both side wall portions 31, respectively, and are curved so as to turn mutually in an opposite direction, and extend downward in the drawing. In each split core member 20, this wire connection claw 31*a* is nipped and joined with the end portion of the coil 15 (see FIGS. 5(*a*) and 5(*b*)).

The two sidewall portions 31 are mutually curved inward in the end portion at the opposite side of the joining portion 32, and from those curved regions, insertion portions 33 are extended. The insertion portions 33 are substantially U-shaped, and open upward in the drawing. As shown in FIGS. 5(*a*) and 5(*b*), in each split core member 20, these insertion portions 33 are inserted into two accommodating recesses 26*a* formed in the setting portions 26 of the bobbins 14, respectively, so that the terminal joining units 34 are fixed to the bobbins 14. This insertion portion 33 is curved in such a way as to open upward, thereby allowing the terminal pin 18 of the short-circuit member assembly 40 to be inserted and, at the same time, can be elastically deformed. The insertion portion 33 is inserted into the accommodating recess 26*a* in a compressed and deformed state, and therefore, in a state where it is accommodated into the accommodating recess 26*a*, it is stopped from being pulled out by its own elastic force, and held stably within the accommodating recess 26*a*. Further, in the present embodiment, portions of the setting portion 26 and the terminal joining unit 34 are accommodated into a recess 10*a* of the core 10 (see FIG. 5(*b*)).

Next, a method of winding the conductive wire, which is a material of the coil 15, on each split core member 20 will be described in detail.

First, a conductive wire winding device 50 used for winding the conductive wire on each split core member 20 will be described.

Figure 7:
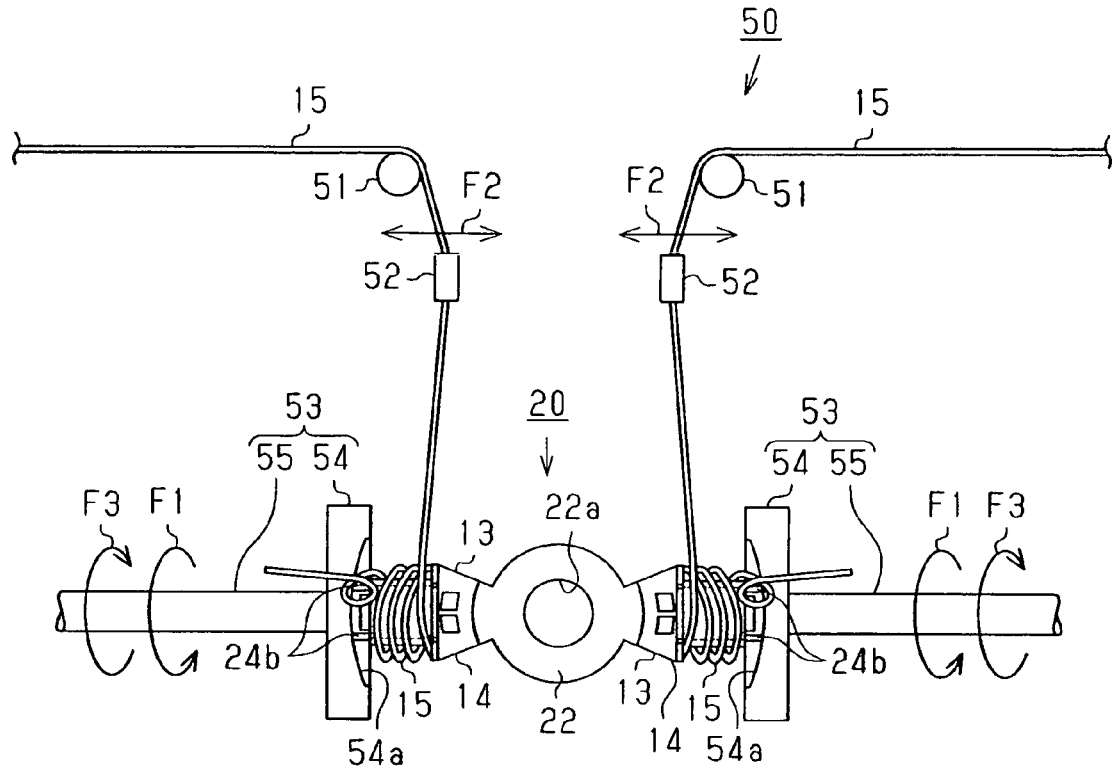
FIG. 7 is a schematic diagram of a conductive wire winding device.

As shown in FIG. 7, the conductive wire winding device 50 comprises two unillustrated conductive wire supply portions, two pulleys 51, two guide members 52, and two jigs 53. The conductive wire supply portions are supply sources of the conductive wires, which are a material of the coils 15. In the drawing and in the following description, the conductive wires are given the same reference numeral 15 as the coils 15. The conductive wires 15 pulled out from the conductive wire supply portions are fed to the split core member 20 held by the jigs 53 through the pulleys 51 and the guide members 52.

Each jig 53 is disposed on the downstream of the corresponding guide member 52 in the feeding direction of the conductive wire 15. Each jig 53 comprises a tooth holding portion 54 and a rotary shaft 55. The holding recess 54*a*, which is formed in the tooth holding portion 54, is shaped so as to correspond to the outer peripheral portion of the tooth 13. Both tooth holding portions 54 support the teeth 13 positioned at the opposite sides, respectively in each split core member 20. In this way, the split core member 20 is held by the two jigs 53. That is, the jigs 53 are provided so that the holding recesses 54*a* are opposed, and between both jigs 53, the split core member 20 is held.

The rotary shaft 55 extends from the opposite side of the holding recess 54*a* in the tooth holding portion 54, and is joined with the rotary shaft of an unillustrated driving motor. The jigs 53 are rotated in the same direction (direction of arrow F1 direction in the drawing) by the driving motors. The split core member 20 is rotated together with the rotation of these jigs 53, so that the conductive wires 15 are simultaneously wound about the two teeth 13 held by the tooth holding portions 54.

Each guide member 52 is disposed downstream of the corresponding pulley 51 in the feeding direction of the conductive wire 15. Each guide member 52 is for guiding the conductive wire 15 pulled out from the corresponding conductive wire supply portion to the bobbin 14. Each guide member 52 is constituted in such a way as to move along the axial direction (direction of arrow F2 in the drawing) of the rotary shaft 55.

The conductive wire winding device 50 performs a winding operation for winding the conductive wires 15 on the bobbins 14 on both teeth 13 of the split core members 20, and an engaging operation (temporary engaging operation) for engaging (temporary engaging) the conductive wires 15 on the outer protruded portions 24b of the bobbins 14.

In the winding operation, the conductive wires 15 pulled out from the conductive wire supply portions are fed to the split core member 20 through the pulleys 51 and the guide members 52. While the conductive wires 15 are being fed, the rotary shafts 55 of the jigs 53 are rotated, so that the conductive wires 15 are wound at the same time on the bobbins 14 on the two teeth 13 held by the tooth holding portions 54. The conductive wires 15 are wound about the two teeth 13 in the same direction as viewed in one direction along the axis of the rotary shafts 55. That is, the conductive wires 15 are wound in a different direction for each tooth 13. When the conductive wires 15 are wound about the bobbins 14 on the teeth 13, each guide member 52 allows the corresponding conductive wire 15 to move between both ends of the corresponding tubular portion 23 in an axial direction of the rotary shaft 55 with respect to the tubular portion 23 of the corresponding bobbin 14. Hence, the conductive wires 15 are wound at a uniform thickness about the bobbins 14. A pair of teeth 13 of the split core member 20 are disposed at angular intervals of 180 degrees, and the angular interval between both teeth 13 is the largest possible. Hence, the conductive wires 15 pulled out of the conductive wire supply portions are prevented from interfering with the collar portions 24 and 25 of the bobbin 14.

In the engaging operation (temporary engaging operation), the conducive wires 15 are guided by the guide members 52 to the outer protruded portions 24b of the bobbins 14. At the same time, each jig 53 is rotated in a direction reverse to the direction at the winding operation time (direction of arrow F3 in the drawing), so that the conductive wires 15 are wound about the outer protruded portions 24b. However, in the winding method to be described later of the conductive wires 15 on each split core member 20, as the engaging operation, the conductive wires 15 are guided and fastened to the outer engaging grooves 24a, which are provided in the outer collar portions 24 of the bobbins 14, and the conductive wires 15 are not spanned on the outer protruded portions 24b. That is, as the engaging operation, an appropriate selection can be made in that the conductive wires 15 are either spanned and engaged with the outer protruded portions 24b or only engaged with the outer engaging grooves 24a. This engaging operation is similarly performed before and after the winding of the conductive wires 15.

Next, the winding method for the conductive wires 15 on the split core member 20 using the conductive wire winding device 50 will be described.

Figure 8:
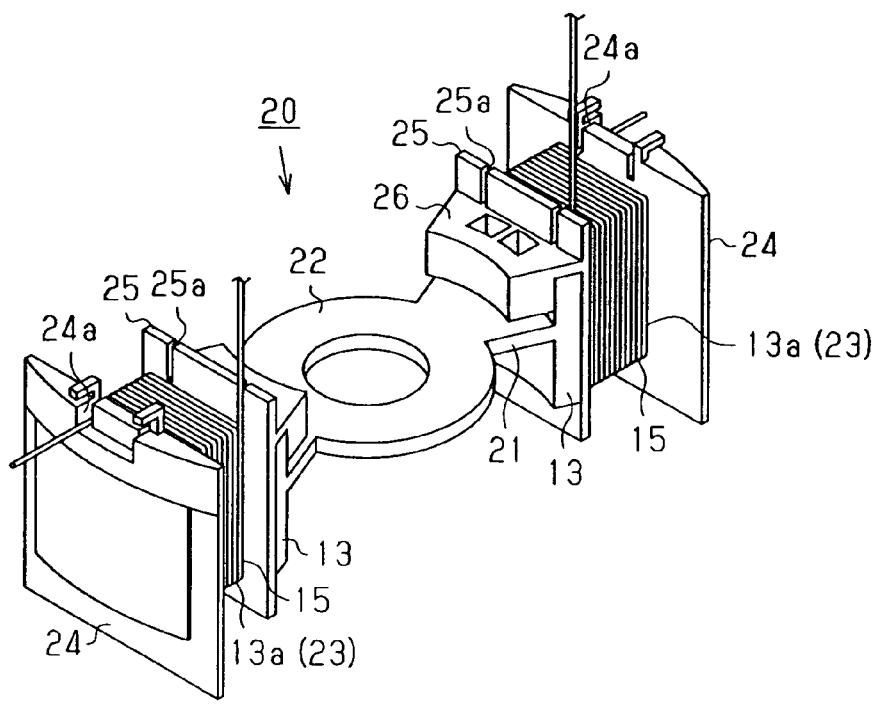

First, by the jigs 53, the teeth 13 of the split core member 20 are held. In this state, as shown in FIG. 8, through the engaging operation, the winding starting ends of the conductive wires 15 are temporarily engaged with each outer collar portion 24 of the bobbins 14. To be more specific, the winding starting end of the conductive wire 15 is engaged with one of the two outer engaging grooves 24a provided in the outer collar portion 24 of each bobbin 14. However, the temporary engaging of the conductive wires 15 to the bobbins 14 is performed with the outer engaging grooves 24a that are not at positions symmetric with respect to the axis of each split core member 20. The winding starting end of the conductive wire 15 becomes the winding starting end of a first coil 15 (coil of the lowest layer) to be described later.

Next, as a first winding step, the above described winding operation is performed. That is, while being guided by the guide member 52, the pole portion 13a of each tooth 13, to be more specific, the conductive wire 15 is wound about the tubular portion 23 of each bobbin 14. At this time, the conductive wires 15 are wound about both teeth 13 in the same direction as viewed in one direction along the rotary shaft of the split core member 20. That is, the conductive wires 15 are wound about each of the teeth 13 in a different direction. When the winding of one layer portion of the conductive wire 15 on each tooth 13 is completed, the first coil 15, which is the coil of the lowest layer, is formed. The portion of the conductive wire 15 extending from each bobbin 14, that is, the winding finishing end of the first coil 15 is fastened to the one of the two inner engaging grooves 25a provided in the inner collar portion 25 of the corresponding bobbin 14. However, the winding finishing end of the first coil 15 is engaged with the inner engaging groove 25a that does not face the outer engaging groove 24a that fastens the winding starting end of the same coil 15. In this state, the conductive wire 15 is pulled out toward the inside in a radial direction of the split core member 20.

Figure 9:
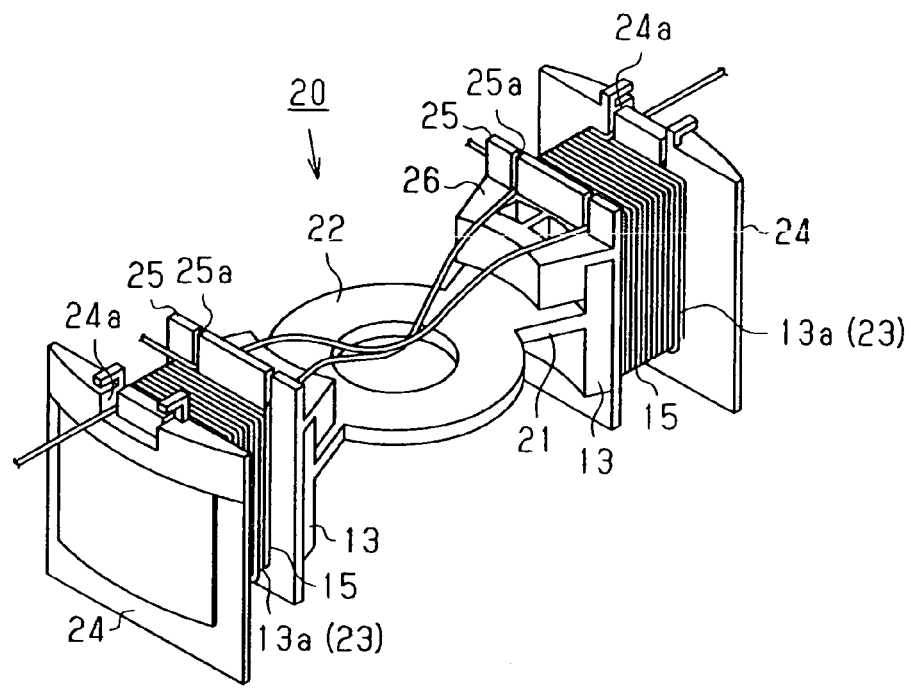

Subsequently, as a spanning step, as shown in FIG. 9, the conductive wire 15 pulled out from each tooth 13, with both jigs 53 rotated in reverse, is fastened to the inner engaging groove 25a of the other tooth 13, thereby the conductive wire 15 is spanned between the inner engaging grooves 25a of the teeth 13. At this time, the conductive wires 15 pulled out from the teeth 13 are spanned so as to cross between the teeth 13. In the present embodiment, since the two conductive wires 15 are spanned so as to cross between the two teeth 13 disposed at an angular interval of 180 degrees, the spanned conductive wires 15 extend substantially along the side wall portions of the teeth 13.

Figure 10:
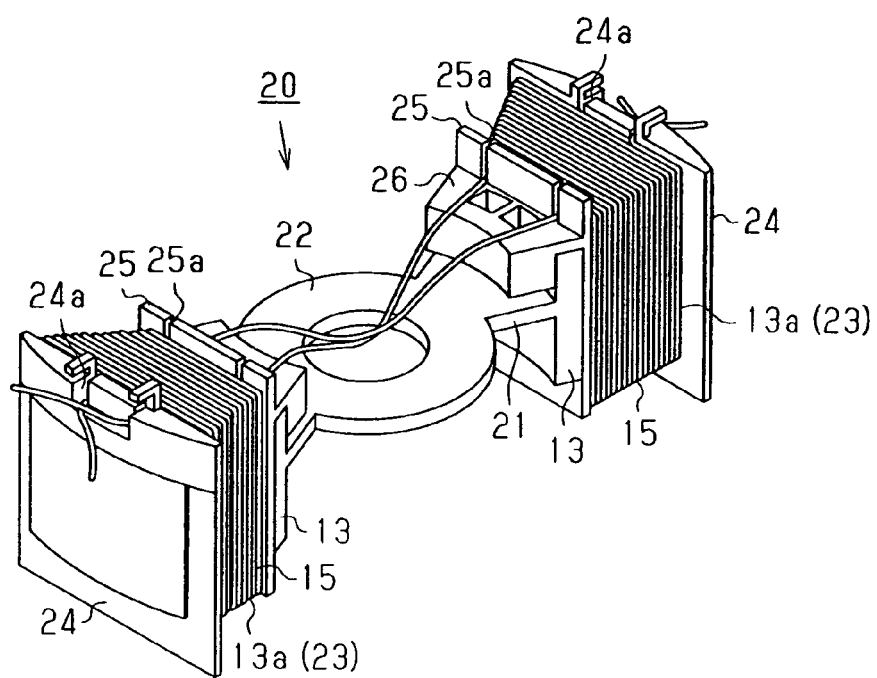
Figure 11:
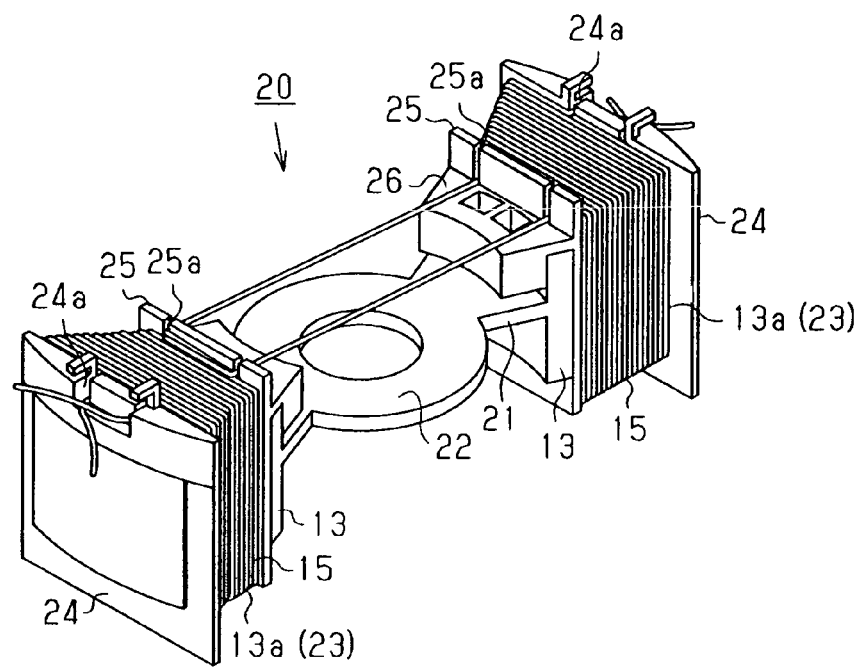
Figure 11:
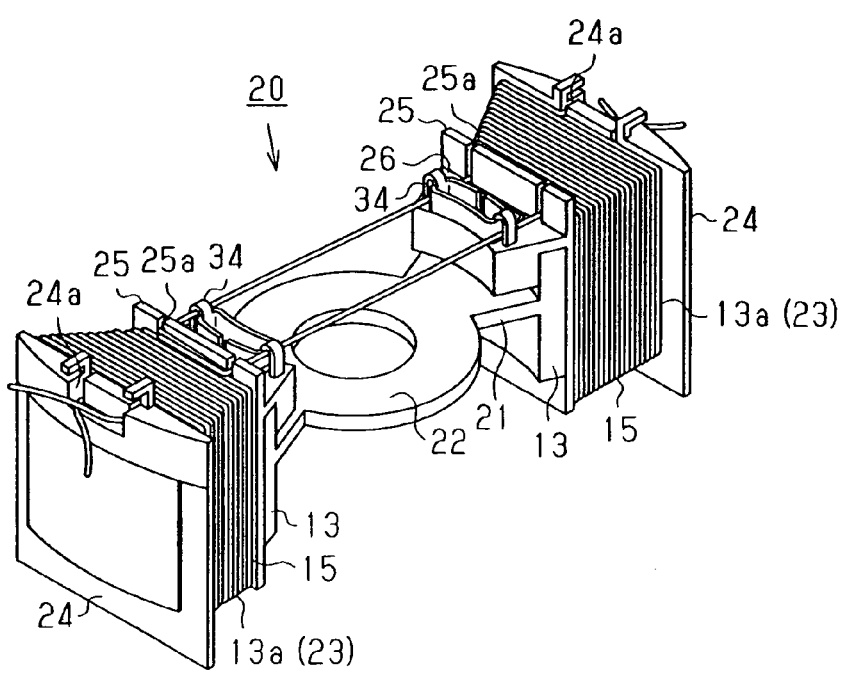

Next, as a second winding step, as shown in FIG. 10, with the position of the inner engaging groove 25a which engages the conductive wire 15 taken as a winding starting position, the winding of the conductive wire 15 is performed on each tooth 13. The conductive wire 15 is engaged with the remaining outer engaging groove 24a in the outer collar portion 24 of each bobbin 14, that is, the outer engaging groove 24a that is not engaged with the winding starting end of the conductive wire 15. In this way, the second coil 15 is formed on the first coil 15. The portion of the conductive wire 15 engaged with the remaining outer engaging groove 24a becomes the winding finishing end of the second coil 15.

Next, as a wire connection step, in each tooth 13, the winding starting end of the first coil 15 pulled out from the one outer engaging groove 24a and the winding finishing end of the second coil 15 pulled out from the other outer engaging groove 24a and are joined at the outer peripheral side of the outer collar portion 24. In this way, the first coil and the second coil are constituted as a single coil 15. A wire connection portion Z (see FIG. 5) of the first and the second coils 15 is accommodated inside the notched portion 24c of the outer collar portion 24. In the present embodiment, in the first winding step, the winding of the conductive wire 15 is started from outside in a radial direction of each tooth 13, and in the second winding step, the winding of the conductive wire 15 is completed outside in a radial direction of each tooth 13. Hence, in the joining step, outside in a radial direction of each tooth 13, the winding starting end of the first coil 15 and the winding finishing end of the second coil 15 can be joined together.

Next, prior to executing a fixing step to be described later, as shown in FIG. 11(a), the crossing portion of two conductive wires 15 extending between two teeth 13 crosses over the inner collar portion 25 of the one bobbin 14 and moves to the inside of the same bobbin 14. Hence, the crossing portion is put into a state engaged with the portion between the inner engaging grooves 25a in the inner collar portion 25. Further, the two conductive wires 15 are put into a state extending in parallel between the two teeth 13.

Next, as a fixing step, as shown in FIG. 11(b), the accommodating recesses 26a of the setting portion 26 provided in each bobbin 14 receive one terminal joining unit 34. At this time, two wire connection claws 31a of each terminal joining unit 34 nip the two conductive wires 15 spanned between both the teeth 13, respectively. In the present embodiment, since the two conductive wires 15 spanned between the teeth 13 extend in parallel, by setting the terminal joining unit 34 alone to the setting portion 26, the conductive wires 15 are suitably nipped into the wire connection claw 31a. Hence, the connection between the terminal joining unit 34 and the conductive wires 15 becomes easy, thereby making it possible to automate the manufacture.

Figure 12A:
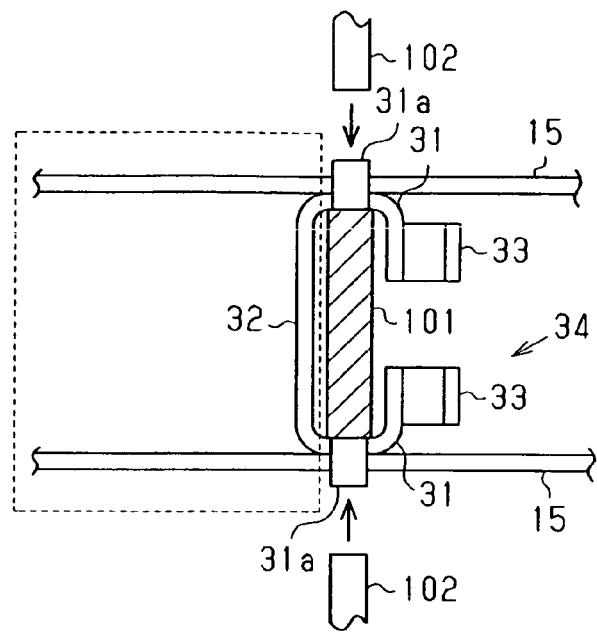
FIGS. 12(a) and 12(b) are views explaining the manufacturing process for the armature.

After that, as a connection step, the wire connection claw 31a and the conductive wire 15 are electrically connected by fusing, and are fixed at the same time. In more detail, as shown in FIG. 12(a), between the sidewall portions 31 of the terminal coupling unit 34, there is disposed a grounding electrode 101, and the electrodes 102 of a device (not shown) for performing fusing from the outside of both of the terminal coupling units 34 and are pressed by a predetermined force. In this state, a large current is caused to flow between the grounding electrode 101 and each electrode 102. Then, the region of the wire connection claw 31a generates heat, and by this heating, the conductive wire 15 is molten, and at the same time, the three parties of the side wall portion 31, the conductive wire 15, and the wire connection claw 31 are joined.

Figure 12B:
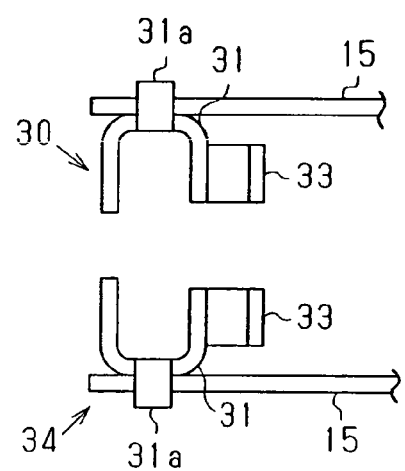

After that, as shown in FIG. 12(b), as a cutting step, two conductive wires 15 spanned between both the teeth 13 are cut and removed in the side inside (portion indicated by the dotted line in FIG. 12(a)) of the wire connection claw 31a. Next, as a splitting step, the center portion of the coupling portion 32 of the terminal coupling unit 34 is cut and removed, and is divided into two terminals 30. In this way, on each tooth 13, two terminals 30 each comprising a wire connection claw 31a and an insertion portion 33 are formed, and at the same time, a coil 15 comprising both ends connected to the two terminals 30, respectively is formed.

Figure 13:
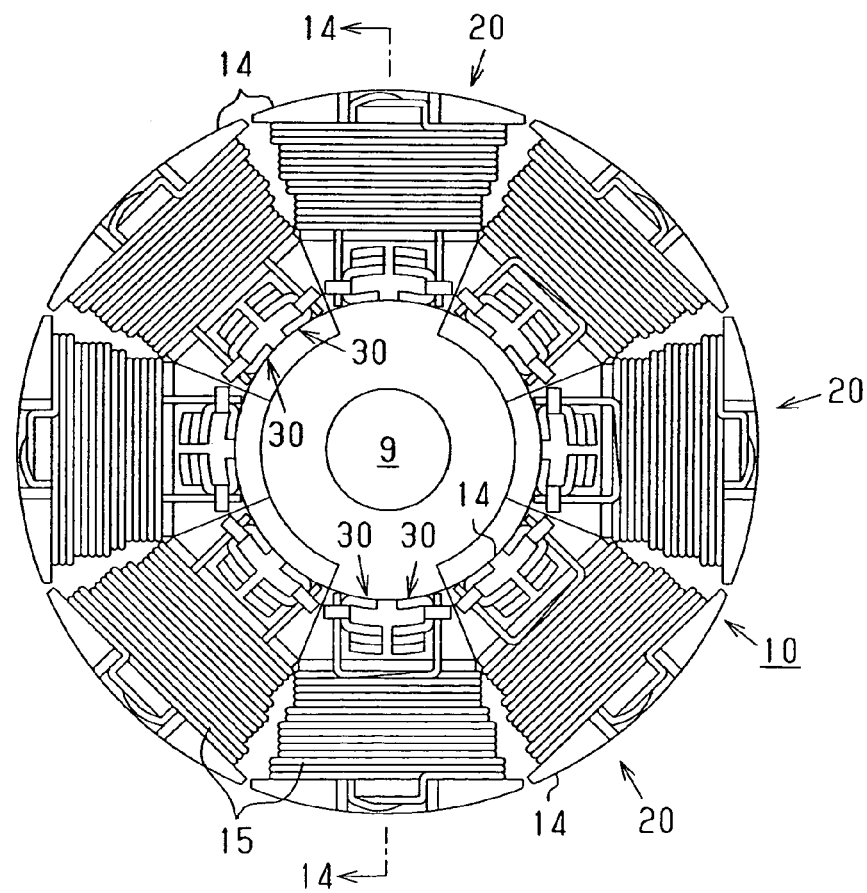
FIG. 13 is a plan view of the armature in the motor of FIG. 1.
Figure 14:
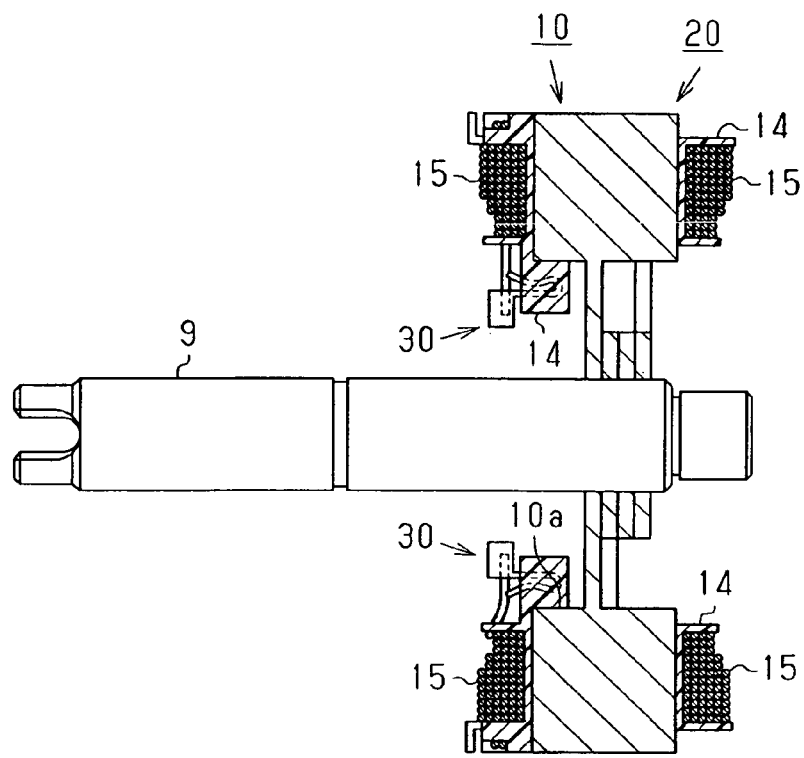
FIG. 14 is a cross-sectional view taken along line 14—14 of FIG. 13.

Next, as a core assembling step, as shown in FIGS. 13 and 14, four split core members 20 each comprising two coils 15 are combined so that the annular portions 22 of the split core members 20 are stacked coaxially, and the combined split core members 20 are press-fitted with the rotary shaft 9.

Figure 15:
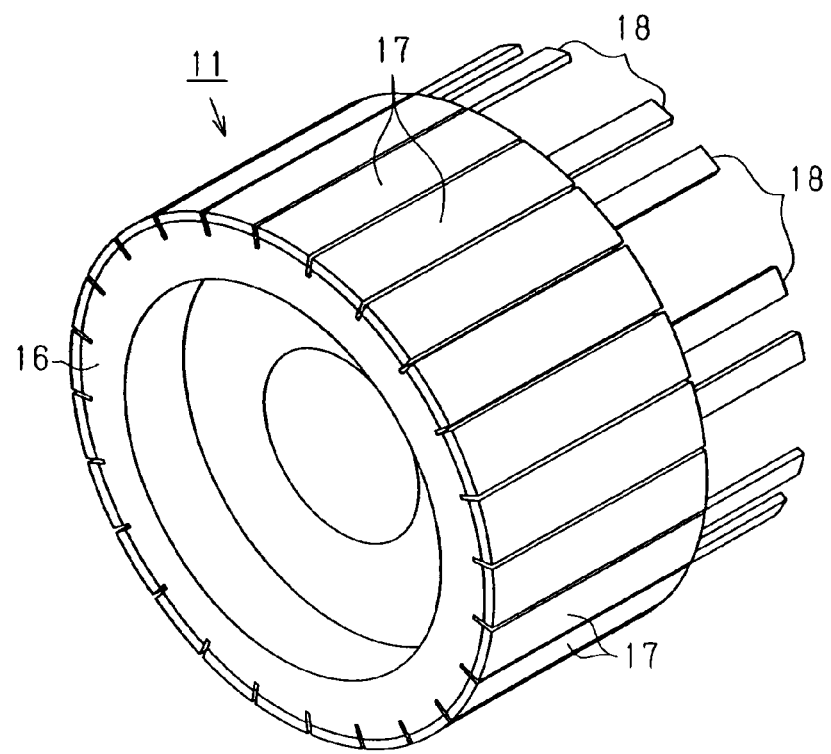
FIG. 15 is a perspective view of a commutator in the mote of FIG. 1.

FIG. 15 shows the commutator 11. As described above, the commutator 11 comprises a plurality of segments 17 disposed on the outer peripheral surface of an insulator 16 in a circumferential direction, and a short-circuit member assembly 40 provided in the end surface of the commutator 11. The short-circuit assembly 40 has a plurality of terminal pins 18. The terminal pins 18 are regularly disposed in a circumferential direction of the commutator 11. That is, sixteen terminal pins 18 extend from sixteen of the twenty-four segments 17, which are not eight of the segments 17 arranged at intervals of two segments 17.

Figure 16:
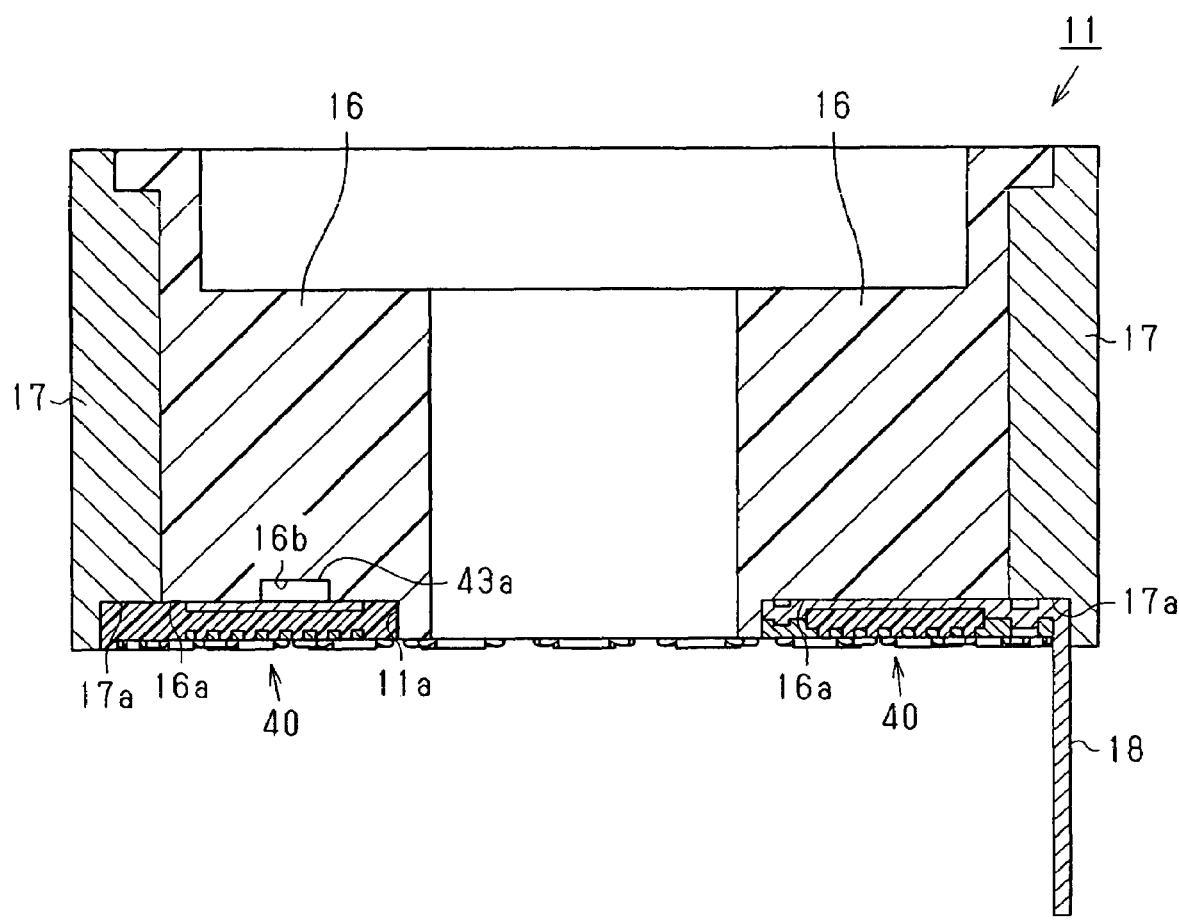
FIG. 16 is a cross-sectional view of the commutator of FIG. 15.

As shown in FIG. 16, the end surface of the commutator 11 confronting the core 10 (see FIG. 2) has an annular accommodating recess 11a for accommodating the short-circuit member assembly 40. The accommodating recess 11a includes a recess 16a formed in the insulator 16 and a notched portion 17a formed in each segment 17. The insulator 16 is provided with a positioning recess 16b for positioning the short-circuit member assembly 40 on the commutator 11.

Figure 17A:
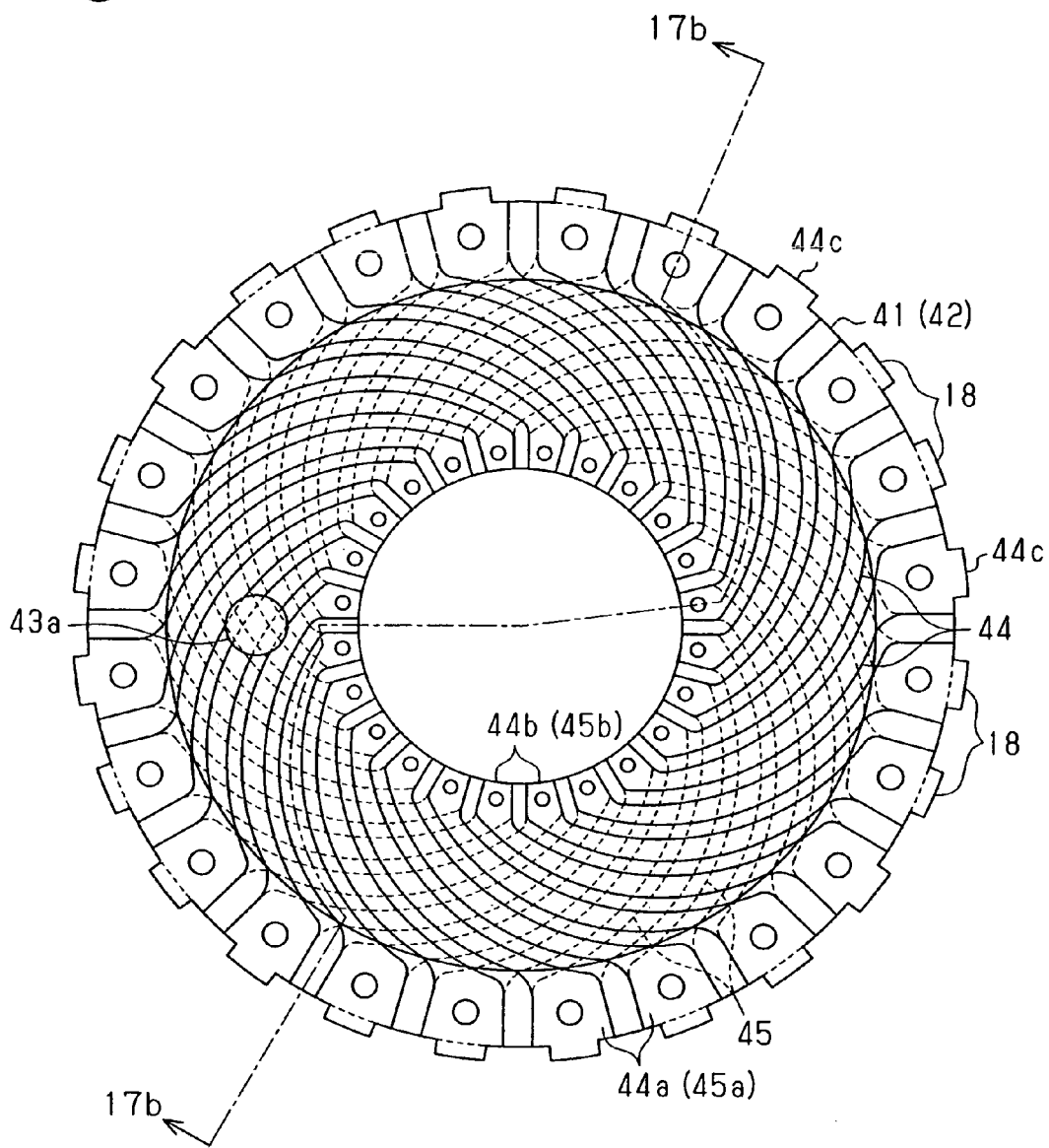
FIG. 17(a) is a plan view of a short-circuit member assembly in the motor of FIG. 1.
Figure 17B:
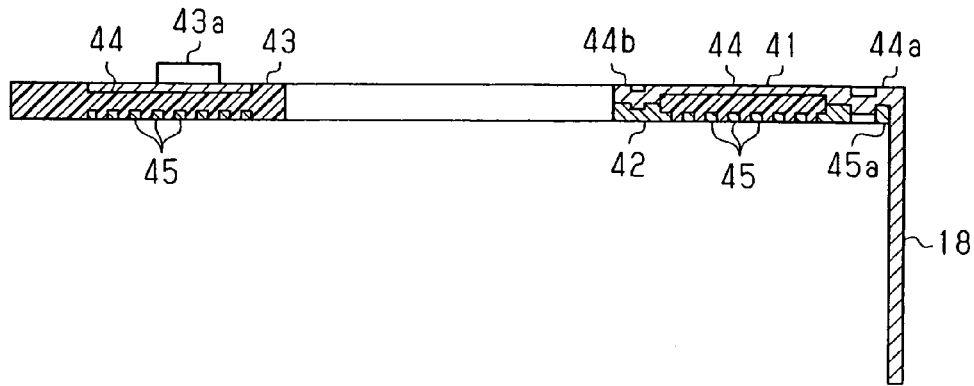
FIG. 17(b) is a cross-sectional view taken along line 17b—17b of FIG. 17(a)

The short-circuit member assembly 40 is annular, and, as shown in FIGS. 17(a) and 17(b), comprises a first conductive member group 41, a second conductive member group 42, and an insulating material 43. The first conductive member group 41 is provided on the surface of the short-circuit member assembly 40 which confronts the commutator 11, and the second conductive member group 42 is provided on the surface of the short-circuit member assembly 40 confronting the core 10.

The first conductive member group 41 includes twenty-four first conductive members 44, and the second conductive member group 42 comprises twenty-four second conductive members 45. Each first conductive member 44 comprises an outer terminal 44a positioned outside in a radial direction of the short-circuit member assembly 40, and an inner terminal 44b positioned inside in a radial direction of the short-circuit member assembly 40. Each second conductive members 45 comprises an outer terminal 45a positioned outside in a radial direction of the short-circuit member assembly 40, and an inner terminal 45b positioned inside in a radial direction of the short-circuit member assembly 40.

The twenty-four first conductive members 44 are disposed in such a way as to be shaped circular as a whole, and moreover, not to be in mutual contact with adjacent members. Further, each first conductive member 44 extends obliquely with respect to a radial direction of the short-circuit member assembly 40 so that the outer terminal 44a and the inner terminal 44b are displaced 60 degrees in a circumferential direction of the short-circuit member assembly 40. The twenty-four second conductive members 45 are similarly disposed so as to be shaped circular as a whole, and moreover, not to be in mutual contact with adjacent members. Further, each second conductive member 45 extends obliquely with respect to a radial direction of the short-circuit member assembly 40 so that the outer terminal 45a and the inner terminal 45b are displaced 60 degrees in a circumferential direction of the short-circuit member assembly 40. However, the first conductive member 44 and the second conductive member 45 have reverse inclinations relative to each other with respect to a radial direction of the short-circuit member assembly 40.

In a state in which the circular first conductive member group 41 and the circular second conductive member group 42 are overlaid, each first conductive member 44 contacts the outer terminal 45a of one of the second conductive members 45 in the outer terminal 44a, and at the same time, contacts the inner terminal 45b of another one of the second conductive members 45 in the inner terminal 44b. Both the outer terminals 44a and 45a are coupled in such a way that a fitting projection provided in one of the same terminals 44a and 45*a* fits in an engaging recess provided in the other of the same terminals 44*a* and 45*a*. Similarly, both the inner terminals 44*b* and 45*b* are coupled in such a way that a fitting projection provided in one of the same terminals 44*b* and 45*b* is engaged with a fitting projection provided in the other one of the same terminals 44*b* and 45*b*. The first conductive member 44 and the second conductive member 45 are not brought into contact at the region other than via the terminal.

As a result of the above, the outer terminal 44*a* and the inner terminal 44*b* in each first conductive member 44 are electrically connected to different second conductive members 45 at positions displaced 60 degrees, respectively. Similarly, the outer terminal 45*a* and the inner terminal 45*b* in each second conductive member 45 are electrically connected to different first conductive members 44 at positions displaced 60 degrees, respectively. Three first conductive members 44 disposed at angular intervals of 120 degrees are electrically connected through the second conductive member 45.

The insulating material 43 is made of insulative resin, and bridges a gap between the first conductive member group 41 and the second conductive member group 42, the gap between the adjacent first conductive members 44, and the gap between the adjacent second conductive members 45. The insulating material 43 has a positioning projection at a position corresponding to the positioning recess 16*b* (see FIG. 16).

The outer terminals 44*a* of the twenty-four first conductive members 44 include sixteen outer terminals 44*a* each having the terminal pin 18, and eight outer terminals 44*a* each having a engaging portion 44*c*. The two outer terminals 44*a* having the terminal pin 18 and the outer terminal 44*a* having the engaging portion 44*c* are alternately disposed in a circumferential direction.

Each engaging portion 44*c* engages with the notched portion 17*a* provided in one of the segments 17, and is restricted in movement toward the segment 17. The proximal portion of each terminal pin 18, as can be seen in plan view in FIG. 17(*a*), has a shape and a size corresponding to the engaging portion 44*c*, and is engaged with the notched portion 17*a* provided in one of the segments 17. Each terminal pin 18 is curved at a right angle from the corresponding outer terminal 44*a*, and extends toward the core 10 (see FIG. 2).

The short-circuit member assembly 40 is fixed to the commutator 11 so that each outer terminal 44*a* contacts one of the segments 17. To be specific, the short-circuit member assembly 40 is accommodated into the accommodating recess 11*a* so that the positioning projection 43*a* is inserted into the positioning recess 16*b*. At this time, each outer terminal 44*a* is accommodated into one of the notched portions 17*a* of the segments 17 so that each outer terminal 44*a* contacts one of the segments 17. In the meantime, in the short-circuit member assembly 40, the inner portion further than the outer terminal 44*a* in a radial direction is accommodated into the recess 16*a* of the insulator 16. In this state, the short-circuit member assembly 40 is swaged in an axial direction and fixed to the commutator 11.

Next, the method for manufacturing the short-circuit member assembly 40 thus constituted will be described.

Figure 18:
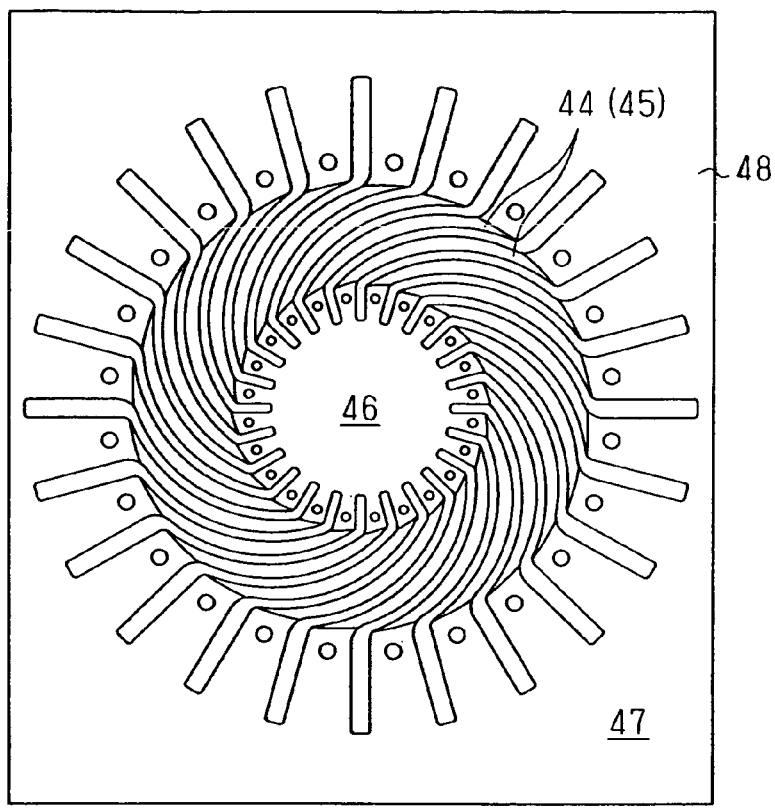
FIGS. 18 and 19 are views for explaining a method for manufacturing the short-circuit member of FIG. 17(a)
Figure 19:
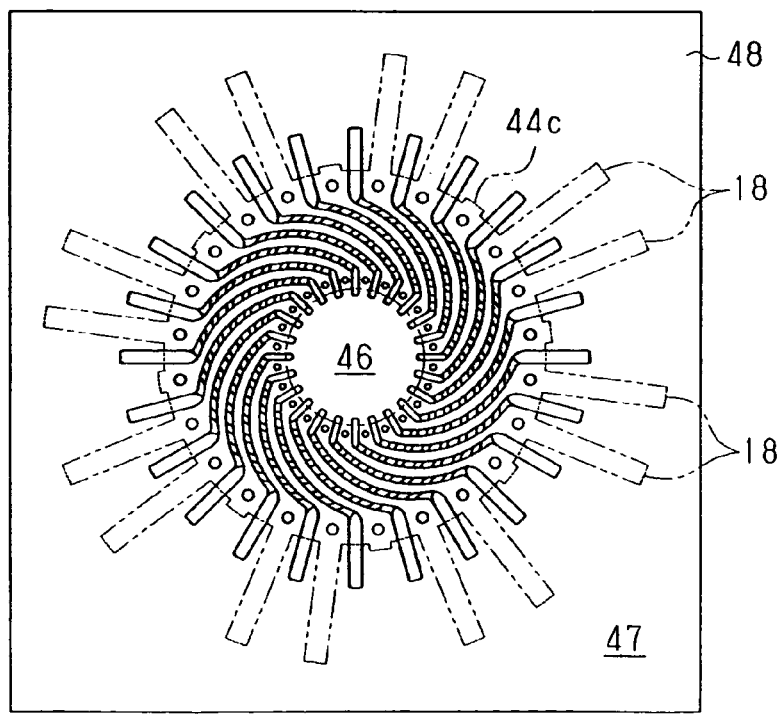

First, as shown in FIG. 18, by subjecting a conductive plate material 48 to a punching process, the first conductive member group 41 is formed, in which twenty-four first conductive members 44 are included with adjacent members mutually isolated in a circumferential direction. Further, at this time in the punching process, when the inner coupling unit 46 that annularly couples the first conductive members 44 inside in a radial direction, and the outer coupling unit 47 that annularly couples the first conductive members 44 outside in a radial direction, are formed on the conductive plate material 48. Further, at this time in the punching process, the outer terminal 44*a* and the inner terminal 44*b* have the engaging recess or the fitting projection. With respect to the second conductive member group 42 also, similarly to the first conductive member group 41, the punching process of the conductive plate material 48 as shown in FIG. 18 is performed. However, with respect to the second conductive member group 42, the extending direction of the conductive member 45 is in reverse to that of the first conductive member group 41. Next, as shown in FIG. 19, two conductive plate materials 48 after the punching process are stacked in a state in which the extending direction of the first conductive member 44 and the extending direction of the second conductive member 45 are in reverse to each other. At this time, the engaging recess is engaged with the fitting projection, so that the outer terminals 44*a* and 45*a* are mutually coupled, and at the same time, the inner terminals 44*b* and 45*b* are mutually coupled.

Next, the insulating material 43 is supplied to a gap created in two conductive plate materials 48, and is hardened. In more detail, two conductive plate materials 48 are accommodated into an unillustrated mold, and molten insulative resin is supplied to the mold and hardened so that the gap created in these two conductive plate materials 48 is filled up, thereby forming the insulating material 43. When the insulative resin is filled up, the positioning projection 43*a* is also formed.

Next, the inner coupling unit 46 and the outer coupling unit 47 in both of the conductive plate materials 48 are removed by punching. To form the first conductive member group 41, the one conductive plate material 48 is punched out as shown by a two-dot chain line in FIG. 19. The other conductive plate material 48 is punched out in a shape removing a region equivalent to the terminal pin 18 from the shape shown by the two-dot chain line. After that, by curving the region equivalent to the terminal pin 18, the short-circuit member assembly 40 as shown in FIGS. 17(*a*) and 17(*b*) is completed.

In the short-circuit member assembly 40 constituted as described above, three outer terminals 44*a* disposed at angular intervals of 120 degrees are mutually electrically connected, and eight such groups of three electrically connected outer terminals 44*a* are formed. Hence, in the commutator 11, three segments 17 contacting three outer terminals 44*a* and electrically connected are mutually short-circuited. Hence, as shown in FIG. 3, the current is allowed to flow not only to the segments 17 directly brought into contact with the anode supply and the cathode supply brushes 7*b* and 7*b*, but also to the segments 17 short-circuited by the short-circuit member assembly 40. Hence, while the number of anode and cathode supply brushes 7*b* and 7*b* are reduced, the current can be supplied to a large number of coils 15.

As an assembly connection step (commutator assembly step), the commutator 11 is assembled into the core 10, so that the terminal pins 18 are pressed and connected to the terminals 30. In more detail, the rotary shaft 9 mounted with the core 10 (see FIGS. 13 and 14) is engaged with the commutator 11 so that the terminals 30 provided in the core 10 and the short-circuit member assembly 40 provided in the commutator 11 come face to face. In accompaniment with this, the terminal pins 18 provided in the short-circuit member assembly 40 are inserted into the insertion portions 33 of the terminal 30, and is electrically connected to the terminal 30. In this way, the armature 3 is completed.

After that, the armature 3 is inserted into the yoke housing 4 provided with permanent magnets 5 from the opening of the yoke housing 4. The yoke housing 4 is fixed with an end frame 6, thereby completing the motor 1 shown in FIG. 2.

The above described embodiment has the following advantages.

(1) After winding the coils 15 on each split core member 20, a plurality of split core members 20 are assembled, thereby completing the core 10. Hence, an armature 3 having a high space factor can be realized. Further, when the conductive wires 15 are wound about the two teeth 13 of each split core member 20 so as to form the coils 15, the conductive wires 15 span between both the teeth 13. By using the portion of the spanned conductive wires 15, that is, the spanned wires, the conductive wires 15 provided in the core 10 can be connected to the commutator 11. Hence, there is no need to hold the end portions of the coils 15 provided in the core 10 for the purpose of connecting them to the commutator 11, so that the armature 3 can be easily produced, thereby improving productivity.

(2) When the conductive wires 15 are wound about the two teeth 13 of each split core member 20 so as to form the coils 15, the winding starting ends and the winding finishing ends of the coils 15 on the teeth 13 are connected and mutually fixed. Hence, after that, when moving to the steps of assembling a plurality of split core members 20 and connecting the coils 15 on each tooth 13 to the commutator 11, there is no need to hold the end portions of the coils 15 so that they are not unfastened. Hence, the armature 3 can be easily produced, thereby improving productivity.

(3) After the first coil 15 is formed on each tooth 13 in the first winding step, the conductive wire 15 pulled out from each tooth 13 is spanned to the other tooth 13, and the second coil 15 is formed on each tooth 13 in the second winding step. The first coil 15 is a coil having only one layer. Hence, the conductive wires 15 spanning between two teeth 13 pass through the inner side of the core 10, rather than a coil end with respect to the axial direction of the motor 1. Hence, the commutator 11 can be disposed at a position as extremely close as possible to the core 10 with respect to the axial direction of the motor 1, and miniaturization in size in the axial direction of the motor 1 is achieved.

(4) Since two conductive wires 15 spanning between two teeth 13 are in a state of mutually extending in parallel, the terminal treatment of the coils 15 can be easily performed inside a radial direction of the teeth 13, thereby improving productivity.

(5) Since two teeth 13 of each split core member 20 are disposed at angular intervals of 180 degrees, even when two conductive wires 15 spanning between two teeth 13 are not provided with an exclusive member for guiding the conductive wires 15, they are disposed in the vicinity of the joining portion 21 and the annular portion 22. Further, the two conductive wires 15 spanning between two teeth 13 are substantially symmetrical with respect to the central axis of the split core member 20, and at the same time, have the same length. This facilitates operations for manufacturing the motor 1.

(6) The winding starting end and the winding finishing end of the coil 15 on each tooth 13 are disposed outside in a radial direction of the tooth 13. Hence, the winding starting end and the winding finishing end of the coil 15 can be easily joined outside in a radial direction of the teeth 13.

(7) After the first coil 15 is formed on each tooth 13, the conductive wire 15 pulled out from the tooth 13 is spanned to the other tooth 13, and the second coil 15 is formed on each tooth 13. After that, the conductive wire 15 spanning between both teeth 13 is cut. Hence, the conductive wires 15 spanning between both the teeth 13 are cut in a state of being held by the coils 15, and there no member or operation is required to hold the conductive wire 15.

(8) The wire connection portion Z of the coils 15 is positioned outside in a radial direction of the core 10 (see FIG. 2). Hence, when the armature 3 is assembled into the stator 2, there is a possibility of the wire connection portion Z interfering with the permanent magnets 5 of the stator 2. However, in the present embodiment, with respect to the insertion direction of the armature 3 into the stator 2, the wire connection portion Z is positioned at a region of the core 10, which is the trailing side in the insertion direction. Hence, the wire connection portion Z of the coil 15 and the permanent magnet 5 of the stator 2 are prevented from interfering with each other during assembly.

(9) The number of permanent magnets 5, that is, the number P of magnet-poles is six, and the number N of slots formed between the teeth 13 is eight, and the number S of segments 17 provided in the commutator 11 is twenty-four. As a result, a short-pitch winding factor becomes equal to or more than 0.9, and a motor 1, which is small and light in weight and yet advantageous for high output, is obtained. The short-pitch winding factor is a feature which takes into consideration intervals of the coil edge for magnet pole pitch, and is proportional to the output of the motor. That is, the lager the short-pitch winding factor is, the larger the output of the motor becomes. Further, since the total of the torque vectors produced in each of the teeth 13 of the armature 3, respectively become zero, and a force acting in a radial direction of the armature 3 becomes zero, vibration of the armature 3 is suppressed.

(10) The conductive wires 15 spanning between both the teeth 13, before being cut, are electrically connected and fixed to the terminal coupling unit 34 and held with respect to the core 10. Hence, after that even when the conductive wires 15 are cut and removed at a position further inside than the wire connection claw 31a of the terminal coupling unit 34, the end portions of the coils 15 formed by the cutting are stably held on the core 10 through the terminal coupling unit 34. After that, when the commutator 11 is assembled into the core 10, the terminal pins 18 of the commutator 11 are connected to the terminals 30 constituted by splitting the terminal coupling units 34. That is, the terminals 30 have a function for holding the end portions of the coils 15 and a function for electrically connecting the end portions of the coils 15 to the commutator 11. Hence, the end portions of the coils 15 stably held by the terminal 30 can be easily and stably connected to the commutator 11, thereby improving productivity.

(11) After each terminal coupling unit 34 having the mutually connected two terminals 30 is held with respect to the core 10, the coil 15 is connected to the terminal coupling unit 34. After that, the terminal coupling unit 34 is split into two terminals 30. By so doing, compared to the case where it is produced one at a time as the terminal 30 from the beginning, a step for mounting the terminal 30 on the core 10 becomes easy.

(12) The terminal pins 18 extend toward the core 10, and the terminals 30 have the insertion portions 33 open toward the commutator 11. Hence, only through the mutual assembling of the core 10 and the commutator 11, the terminal pins 18 and the terminals 30 are electrically connected. Hence, the operation for connecting the end portions of the coils 15 and commutator 11 becomes easy, thereby improving productivity. Further, since a space for connecting the coils 15 and the commutator 11 is not required, miniaturization of the armature 3 is achieved.

(13) The terminal pins are regularly disposed in a circumferential direction of the commutator 11. Hence, the connection regions between the commutator 11 and the core 10 are regularly disposed in a circumferential direction of the armature 3 so that the armature 3 is stably rotated, and the generation of vibration and noise during rotation of the armature 3 can be suitably suppressed.

(14) Since the inner surface in a radial direction of each tooth 13 becomes a radiating surface exposed at a portion other than in a region coupled to the joining portion 21, temperature rise of the coil 15 as wound about the tooth 13 can be controlled. Further, the core 10 has recesses 10a in the surface opposing the commutator 11, and the recesses 10a accommodate portions of the setting portions 26 and the terminals 30. Hence, the setting portions 26 and the terminals 30 are prevented from greatly protruding from the core 10 in an axial direction, and miniaturization of size in the axial direction of the armature 3 is achieved.

Next, a second embodiment according to the present invention will be described in accordance with FIGS. 20 to 24. The present embodiment, compared to the first embodiment, is different only in the configuration of a conductive wire winding device 60, which winds the coils 15 on the teeth 13, and the winding method for the conductive wires 15. Hence, the same components as the first embodiment will be given the same reference numerals with the explanation thereof omitted, and the description will focus on the portions different from the first embodiment.

Figure 20:
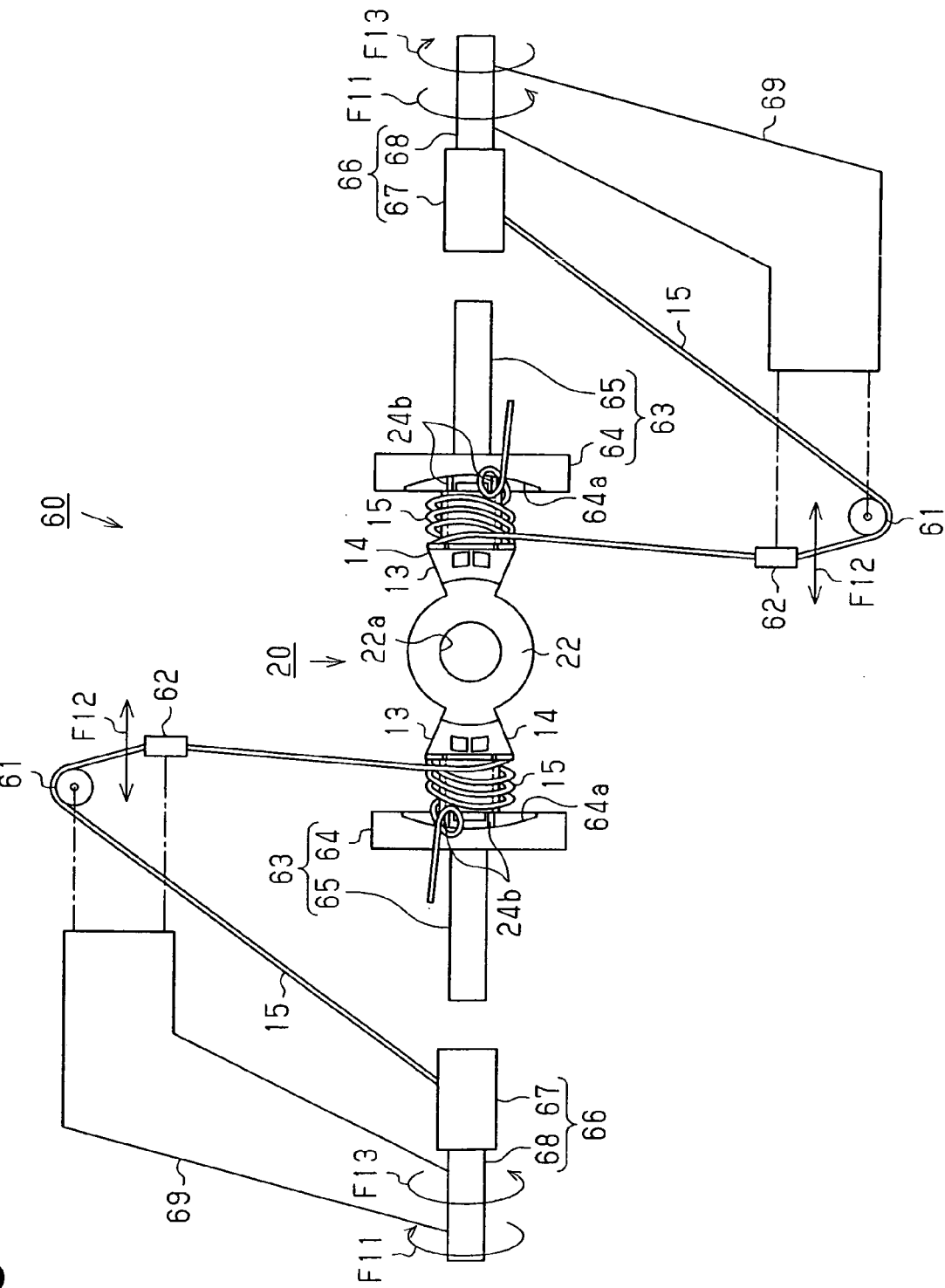
FIG. 20 is a schematic diagram of a conductive wire winding device according to a second embodiment of the present invention.

First, the conductive wire winding device 60 used in the present embodiment will be described. As shown in FIG. 20, the conductive wire winding device 60 comprises two pulleys 61, two guide members 62, and two jigs 63. Further, the conductive wire winding device 60 comprises two conductive wire supply portions 66, in which the conductive wires 15 are pulled out from the conductive wire supply portions 66 and fed to a split core member 20 held by the jigs 63 through the pulleys 61 and guide members 62.

Each jig 63 is disposed downstream of the corresponding guide member 62 in the feed direction of the conductive wire 15. Each jig 63 comprises a tooth holding portion 64 and a support shaft 65. A holding recess 64a formed in the tooth holding portion 64 is shaped corresponding to the outer peripheral portion of the teeth 13. Both the tooth holding portions 64 support the teeth 13 positioned at mutually opposite sides in the split core member 20, respectively. Hence, the split core member 20 is held by two jigs 63. That is, each jig 63 is provided such that the holding recesses 64a are opposed to each other, and between both the jigs 63, there is held the split core member 20.

The support shaft 65 extends from the opposite side of the holding recess 64a in each tooth holding portion 64. Each conductive wire supply portion 66 comprises a supply portion 67 and a rotary shaft 68. The rotary shaft 68 extends from the supply portion 67 to the opposite side of the corresponding jig 63. Each rotary shaft 68 is coupled with the pulley 61 and the guide member 62 through a coupling arm 69. The rotary shaft 68 is coupled with the rotary shaft of an unillustrated driving motor. Both the conductive supply portions 66 are rotated in reverse to each other (F11 direction in the drawing) by the driving motors. In accompaniment with the rotation of the conductive supply portion 66, the pulley 61 and the guide portion 62 are rotated around the rotary shaft 68. In a state in which the split core member 20 is held by both jigs 63, these conductive supply portions 66 are rotated, so that the conductive wires 15 are simultaneously wound (flyer winding) on the two teeth 13 of the split core member 20.

Each guide member 62, similarly to the guide member 52 in the first embodiment, is disposed downstream of the corresponding pulley 61, and is constituted in such a way as to move along the axial direction (direction of arrow F12 in the drawing) of the rotary shaft 68.

Further, the conductive wire winding device 60, similarly to the first embodiment, performs the winding operation and engaging operation (temporary engaging operation) for the conductive wires 15.

In the winding operation, the conductive wires 15 as pulled out from the conductive wire supply portions, are fed to the split core member 20 through the pulleys 61 and the guide members 62. While the conductive wires 15 are being fed, the conductive wire supply portions 66 are rotated, so that the conductive wires 15 are simultaneously wound about the bobbins 14 on the two teeth 13 held by the tooth holding portions 64. The conductive wires 15 are wound about the two teeth 13 in different directions as viewed from one direction along the axis of the rotary shafts 68. That is, different from the first embodiment, the conductive wires 15 are wound about the teeth 13 in the same direction. When the conductive wires 15 are wound about the bobbins 14 on the teeth 13, the guide members 62 allow the conductive wires 15 to move between both ends of the tubular portions 23 in the axial direction of the rotary shafts 68 with respect to the tubular portions 23 of the bobbins 14. Hence, the conductive wire 15 is wound about each bobbin 14 at a uniform thickness. A pair of teeth 13 of the split core member 20 is disposed at angular intervals of 180 degrees, and the angular interval between both the teeth 13 is the largest possible maximum value. Hence, the conductive wires 15 as pulled out of the conductive wire supply portion 66 are prevented from interfering with the collar portions 24 and 25 of the bobbins 14.

In an engaging operation (temporary engaging operation), the coils 15 are guided by the guide members 62 and are guided to outer protruded portions 24b of the bobbins 14. In accompaniment with this, the conductive wire supply portions 66 are rotated in a direction (the direction of the arrow F13 in the drawing) opposite to the direction of the winding operation, so that the conductive wires 15 are wound about the outer protruded portions 24b. Alternatively, instead of the conductive wires 15 being wound about the outer protruded portions 24b, the conductive wires 15 may be guided and engaged with outer engaging grooves 24a provided in the outer collar portions 24 of the bobbins 14. In the winding method for the conductive wire 15 on each split core member 20, to be described later, as the engaging operation, the conductive wire 15 is engaged with the outer engaging groove 24a. This engaging operation is similarly operated before and after the winding of the conductive wires 15.

Next, the winding method for the conductive wires 15 on each split core member 20 using the conductive wire winding device 60 will be described.

Figure 21:
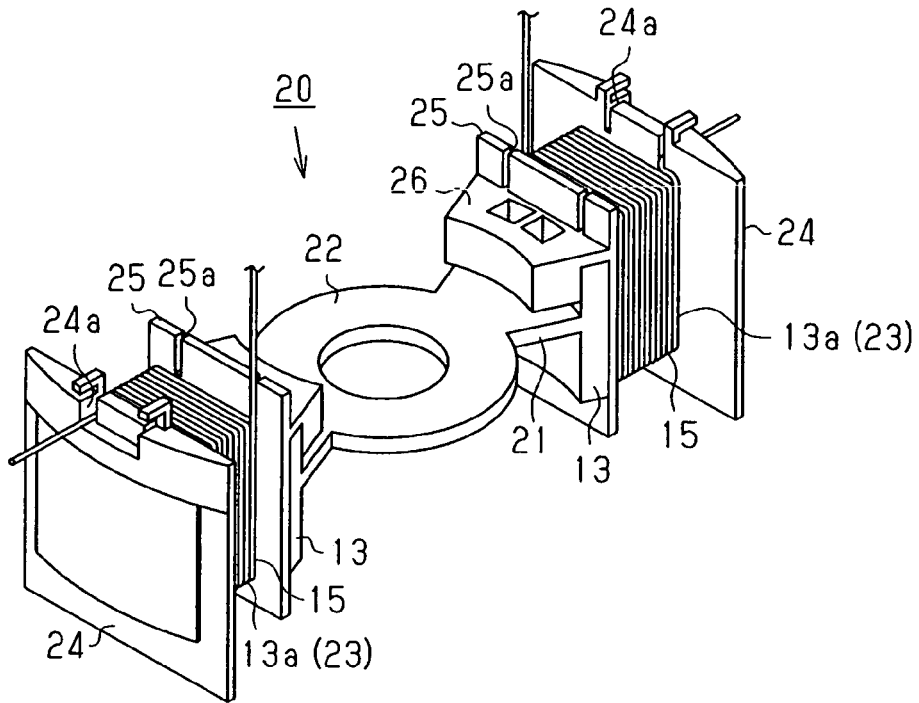
FIGS. 21 to 24 are views for explaining the manufacturing process for the armature in the second embodiment.

First, by using both the jigs 63, the two teeth 13 of the split core member 20 are held. In this state, as shown in FIG. 21, the engaging operation is performed, so that the winding starting ends of the conductive wires 15 are temporarily engaged with the outer collar portions 24 of the bobbins 14 mounted on the two teeth 13 of the split core member 20. To be more specific, one of the two outer engaging grooves 24a provided in the outer collar portion 24 of each bobbin 14 holds the winding starting end of the corresponding conductive wire 15. However, different from the first embodiment, the temporary engaging of the conductive wires 15 with the bobbins 14 is performed with the outer engaging grooves 24, which are at positions symmetric with respect to the axis of each split core member 20. The winding starting ends of the conductive wires 15 become the winding starting ends of first coils 15 to be described later.

Next, as a first winding step, the above described winding operation is performed. That is, while being guided by the guide member 62, the conductive wire 15 is wound about a pole portion 13a of each tooth 13, to be more specific, a tubular portion 23 of each bobbin 14. At this time, the conductive wires 15 are wound about the two teeth 13 in mutually different directions as viewed from one direction along the axis of the rotary shaft 68. That is, the conductive wires 15 are wound about the teeth 13 in the same direction. When the winding of one layer portion of the conductive wire 15 on each tooth is completed, the first coil 15, which is the coil of the lowest layer, is formed. The portion of the conductive wire 15 extending from each bobbin 14, that is, the winding finishing end of the first coil 15 is engaged with one of the two inner engaging grooves 25a provided in the inner collar portion 25 of the corresponding bobbin 14. However, the winding finishing end of the coil 15 is engaged with the inner engaging groove 25a that is not opposite the outer fastening grove 24a engaged with the winding starting end of the coil 15. In this state, two conductive wires 15 are pulled out to the inner side in the radial direction of the split core member 20. That is, the two conductive wires 15 are pulled out from the outer engaging grooves 24a, which are at positions symmetric with respect to the axis of the split core member 20 toward the inner side in a radial direction of the split core member 20.

Figure 22:
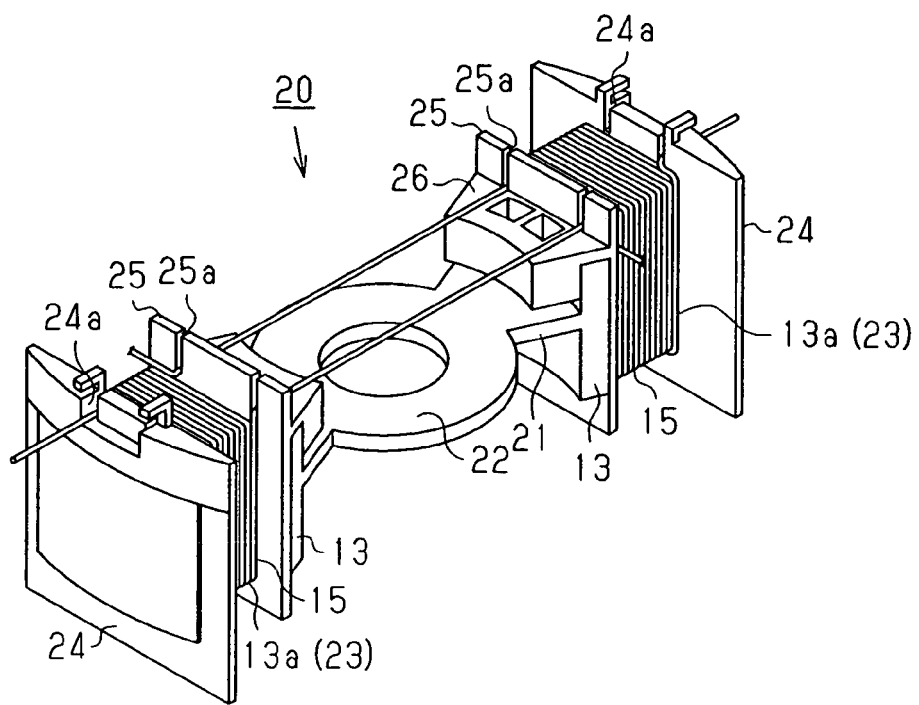

As a subsequent spanning step, as shown in FIG. 22, the conductive wire 15 pulled out from each tooth 13, with both the jigs 63 reversed, is engaged with the inner engaging groove 25a of the other tooth 13, whereby the conductive wire 15 spans between the inner engaging grooves 25a of both of the teeth 13. At this time, the conductive wires 15 as pulled out from both the teeth 13, span between both the teeth 13 so as to be substantially in parallel.

Figure 23:
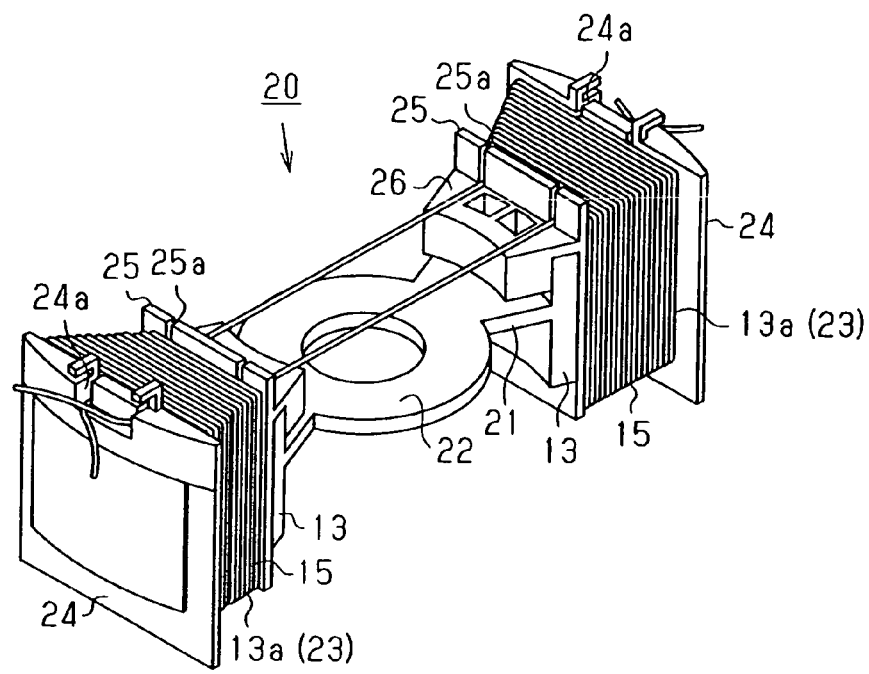

Next, as a second winding step, as shown in FIG. 23, with the positions of the inner engaging grooves 25a engaged with the conductive wires 15 taken as a winding starting position, the winding of the conductive wires 15 on the teeth 13 is performed. The conductive wires 15 are engaged with the remaining outer engaging grooves 24a in the outer collar portion of the bobbins 14, which are not engaged with the winding starting end portions of the coils 15. In this way, the second coils 15 are formed on the first coil 15. The portions of the conductive wires 15 engaged with the remaining outer engaging grooves 24a become the winding finishing ends of the second coils 15.

Figure 24:
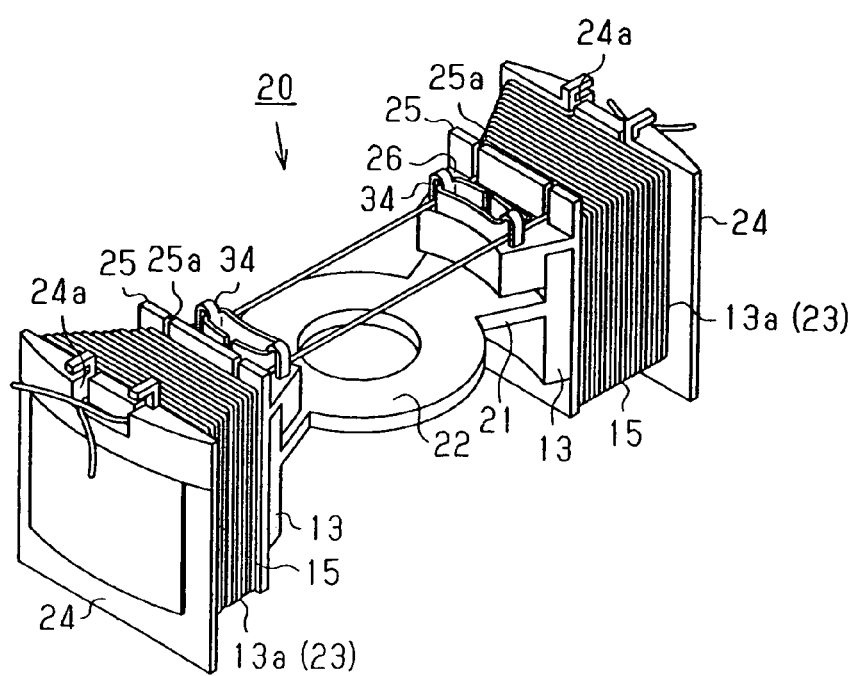

Next, a wire connection step is performed similarly to the first embodiment. That is, in each tooth 13, the winding starting end of the first coil 15 and the winding finishing end of the second coil 15 are joined. After that, as a fixing step, as shown in FIG. 24, terminal coupling units 34 are inserted into both accommodating recesses 26a of the setting portions 26 provided in the bobbins 14. At this time, two wire connection claws 31a of each terminal coupling unit 34 nip two conductive wires 15 spanned between both the teeth 13, respectively. In the present embodiment, since two conductive wires 15 spanned between both the teeth 13 extend in parallel, by only setting the terminal joining units 34 to the setting portions 26, the conductive wires 15 are suitably nipped by the wire connection claws 31a. Hence, the connection between the terminal joining units 34 and the conductive wires 15 becomes easy, thereby making it possible to automate manufacturing. After that, similarly to the first embodiment, a connection step, a cutting step, a core assembly step, and a commutator assembly step, and the like are performed in order so as to produce an armature 3.

In the second embodiment, two conductive wires 15 spanned between the two teeth 13 of each split core member 20 extend in parallel. Hence, the process for a portion of the spanned conductive wires 15, that is, the treatment of the crossed wires can be easily performed, thereby improving productivity. Further, since the step as shown in FIG. 11(a) in the first embodiment, that is, a step of moving the crossed portion of two conductive wires 15, which extend between the two teeth 13, is not required, the manufacturing process can be simplified.

Next, a third embodiment of the present invention will be described. In the first embodiment, though the conductive wires 15 are wound about the two teeth 13 of each split core member 20 by a bobbin winding, the conductive wires 15 can be wound also on the two teeth 13 in another state. For example, in the present third embodiment, by using a conductive wire winding device 70 as shown in FIG. 25, the conductive wires 15 are wound about each split core member 20 by a flyer winding. The conductive wire winding device 70 shown in FIG. 25 comprises a pair of conductive wire supply portions 76 each having a supply portion 77 and a rotary shaft 78, which are similarly constituted as the conductive wire winding devices 60 used in the second embodiment, and a pulley 71 and a guide member 72 individually coupled to the conductive wire supply portion 76 by a coupling member 79. The conductive wire winding device 70, similarly to the second embodiment, further comprises a pair of jigs 73 each having a tooth holding portion 74 and a support shaft 75. The outer peripheral portion of each tooth 13 of the split core member 20 is accommodated and held by a holding recess 74a of a tooth holding portion 74. By this conductive wire winding device 70, the conductive wire 15 is wound about the two teeth 13 in the same direction as viewed from one direction along the axis of the rotary shafts 78. That is, similarly to the first embodiment, the conductive wires 15 are wound about the teeth 13 in different directions.

Next, a fourth embodiment of the present invention will be described in accordance with FIGS. 26(a) to 29. In the present embodiment, the same components as the first embodiment will be given the same reference numerals with the explanation thereof omitted, and the description will focus on the portions different from the first embodiment.

Figure 26A:
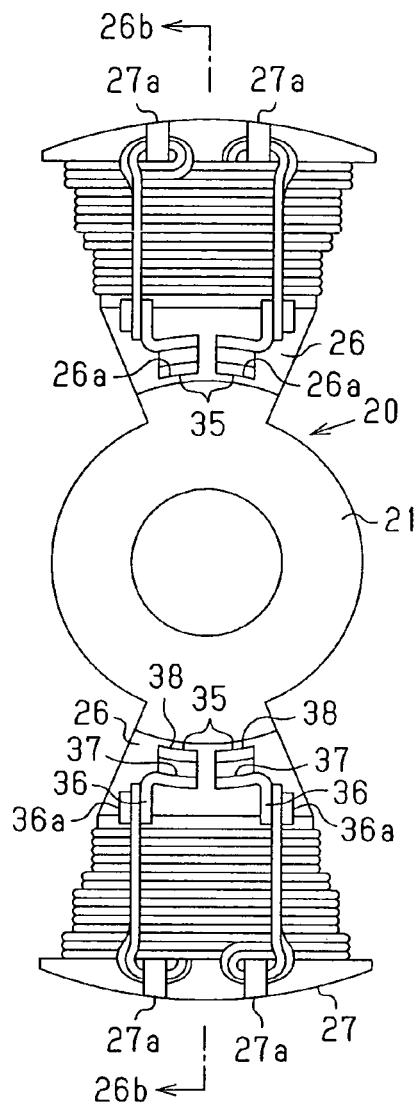
FIG. 26(a) is a plan view for explaining a manufacturing process for an armature according to a fourth embodiment of the present invention.
Figure 26B:
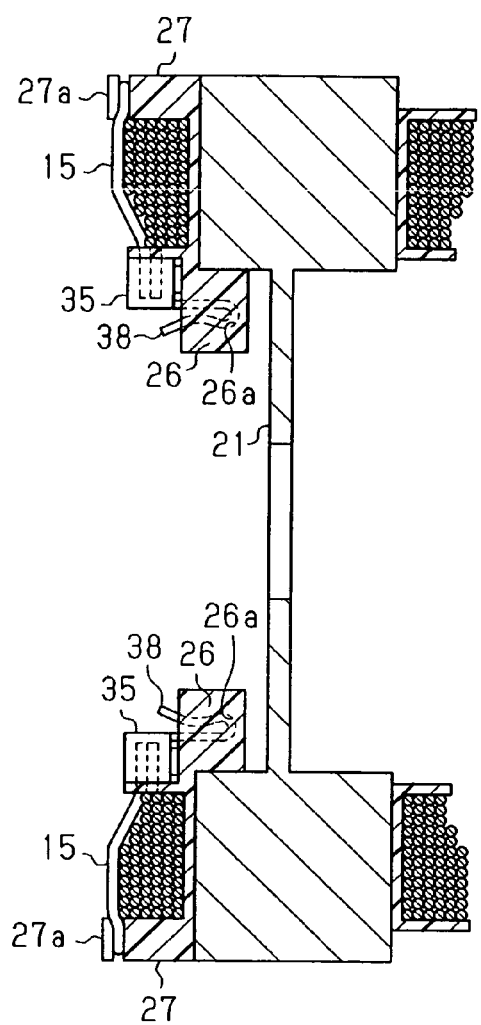
FIG. 26(b) is a cross-sectional view taken along line 26b—26b of FIG. 26(a)

In the present embodiment, as shown in FIGS. 26(a) and 26(b), a coil 15 is wound about each of both teeth 13 of a split core member 20 through a bobbin 27 having two outer protruded portions 27a. The bobbin 27 has the same setting portion 26 as the setting portion 26 of the bobbin 14 in the first embodiment, and the setting portion 26 is provided with two terminals 35.

Each terminal 35 is formed of a metallic plate, which is curved and substantially L-shaped. In more detail, each terminal 35 comprises a sidewall portion 36, and a curved portion 37 extending in a curve to the sidewall portion 36. A wire connection claw 36a extends from the sidewall portion 36. In both the terminals 35 on each bobbin 27, both the wire connection claws 36a extend in a curve to the sidewall portions 36 so as to be directed to the outside. The wire connection claws 36a are nipped and joined with the end portion of the coils 15.

An insertion portion 38 extends from each curved portion 37. Each insertion portion 38 has the same configuration as the insertion portion 33 in the first embodiment. The insertion portions 38 of the two terminals 35 are inserted into two accommodating recesses 26 formed in the setting portions of the bobbin 27, respectively.

Figure 27A:
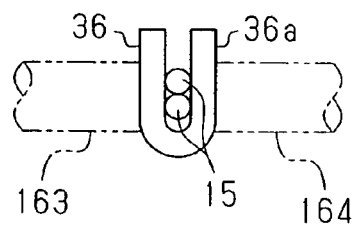
FIGS. 27(a) and 27(b) are views for explaining the manufacturing process for the armature in the fourth embodiment.
Figure 27B:
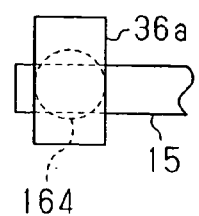

In the fourth embodiment, the winding starting end and the winding finishing end of the coil 15 wound about each tooth 13 are fastened individually on the outer protruded portion 27a on the outside in a radial direction of the tooth 13, and spanning up to the wire connection claw 36a of the corresponding terminal 35 along the outer surface of the coil 15. Each end portion of the coil 15 is nipped and joined by a wire connection claw 36a. To be more specific, as shown in FIGS. 27(a) and 27(b), in a state in which the coil 15 is nipped between the sidewall portion 36 and the wire connection claw 36a, the current is allowed to flow while being pressurized by a plus electric pole 163 and a minus electric pole 164 from both sides, and the sidewall portion 36, the end portion of the coil 15, and the wire connection claw 36a are joined together.

Figure 28:
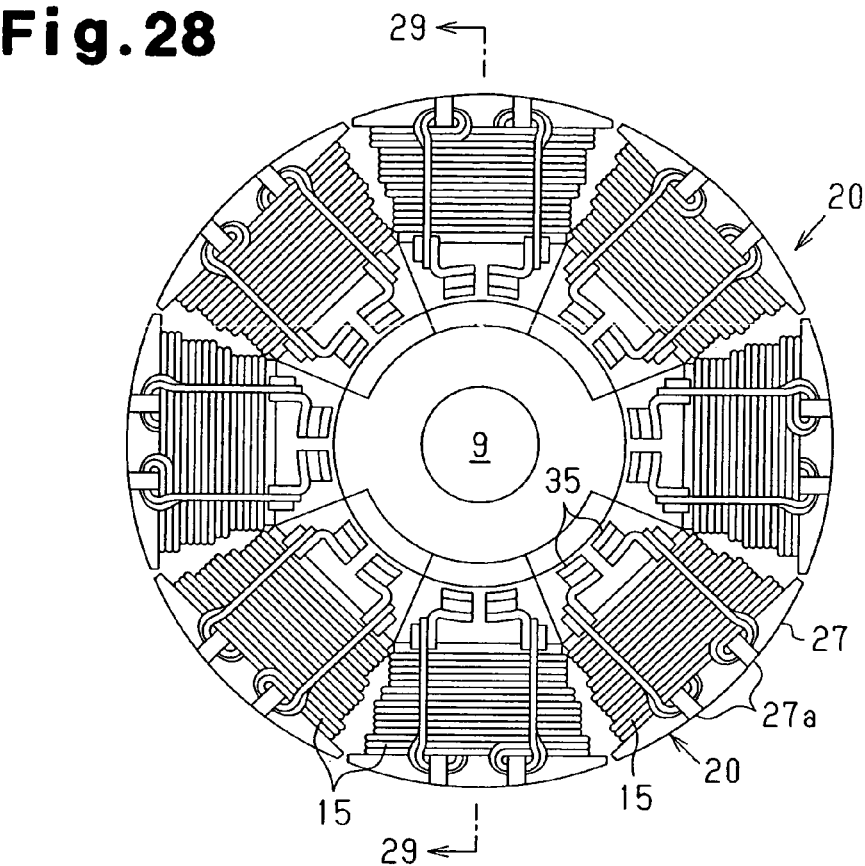
FIG. 28 is a plan view showing the armature in the fourth embodiment.
Figure 29:
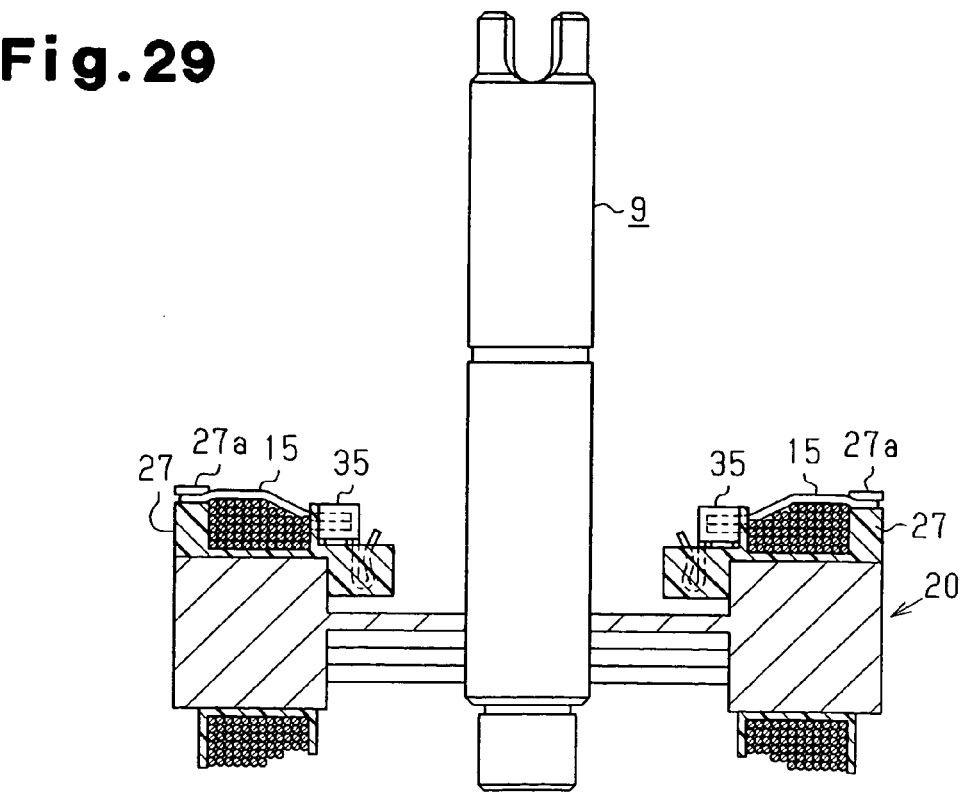
FIG. 29 is a cross-sectional view taken along line 29—29 of FIG. 28.

As shown in FIGS. 28 and 29, four split core members 20 each comprising two coils 15 are assembled so as to be stacked in the axial direction, and are inserted into the rotary shaft 9.

As described above, in the fourth embodiment, the winding starting end and the winding finishing end of the coil 15 wound about each tooth 13 span from the outside in a radial direction of the tooth 13 to the inside in a radial direction, and are connected to the terminal 35. Hence, the wire connection portion of the coils 15 is not formed on the outside in a radial direction of each tooth 13, and the formation of such a wire connection portion can be omitted. Since it is only necessary to engage the end portions of the coil 15 in a section outside in a radial direction of the teeth 13, the bobbins 27 can be made into simplified shapes.

Figure 30:
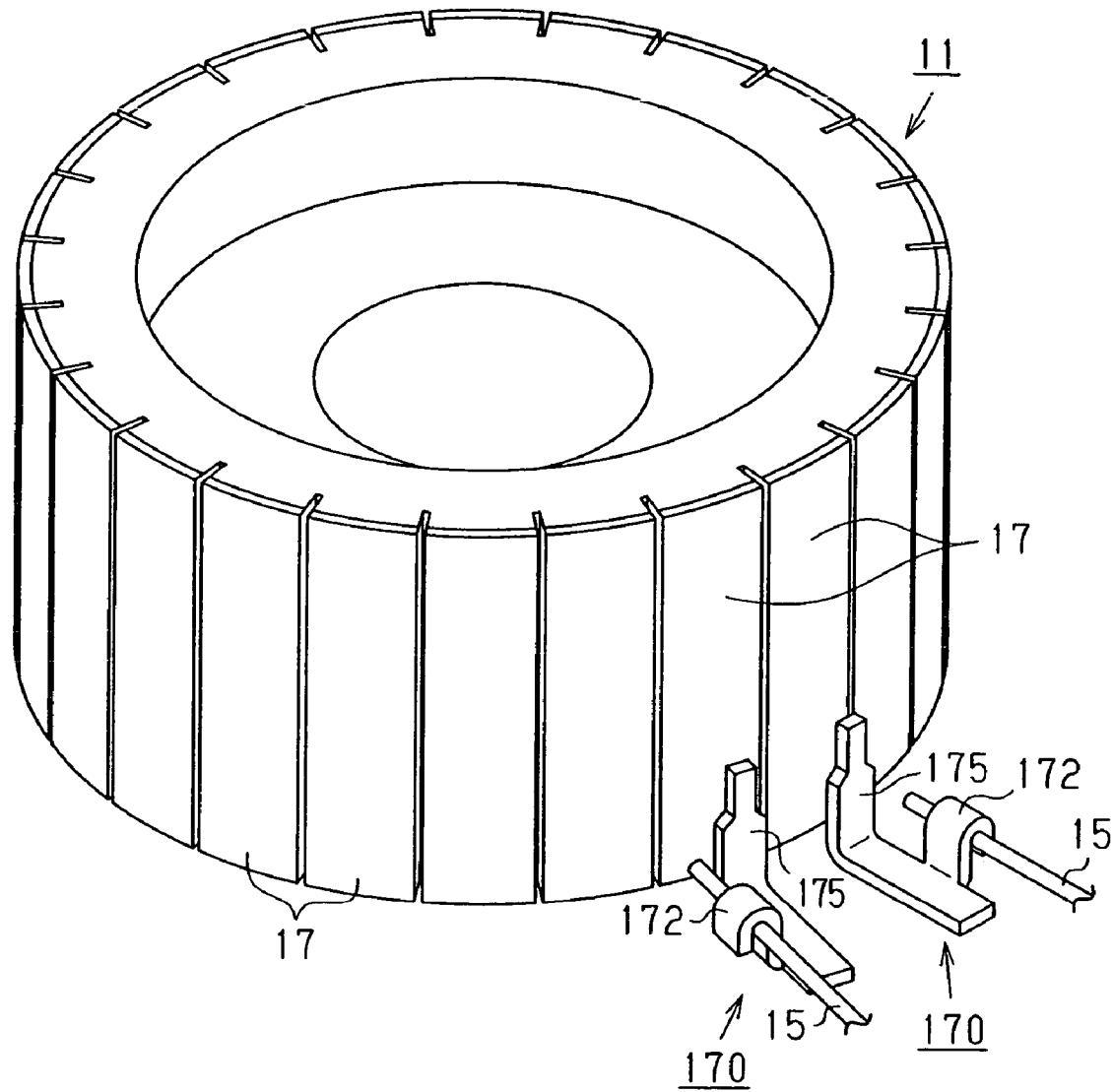
FIG. 30 is a perspective view showing a terminal according to a fifth embodiment of the present invention.

Next, a fifth embodiment of the present invention will be described. In each of the above described embodiments, through first contact portions provided in the commutator 11, are the terminal pins 18 protruding toward the core 10, and through second contact portions provided in the core 10, are the terminals 30 and 35 having insertion portions 33 and 38 open toward the commutator 11, however, the states of the first contact portions and the second contact portions are not limited to this. For example, in the present fifth embodiment, as shown in FIG. 30, terminals 170 are used that each comprise a fastening claw 172 for fastening the end portion of a coil 15 wound about a tooth (not shown) of the core and a joining piece 175 joined with one of the segments 17 provided in the commutator 11 by welding or the like The joining pieces 175 are equivalent to the first contact portions, and the terminals 170 are equivalent to the second contact portions.

Figure 31:
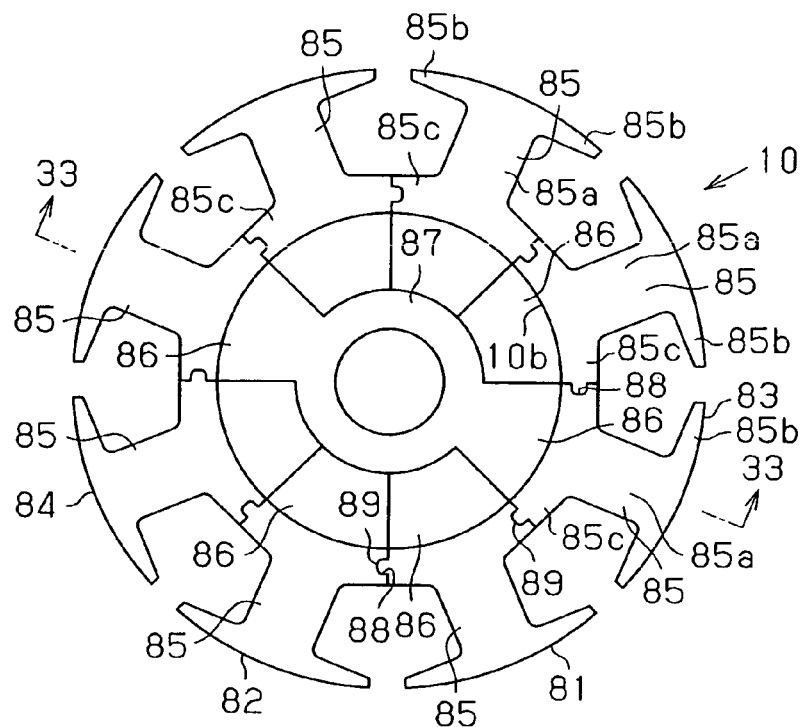
FIG. 31 is a plan view of a core according to a sixth embodiment of the present invention.
Figure 32:
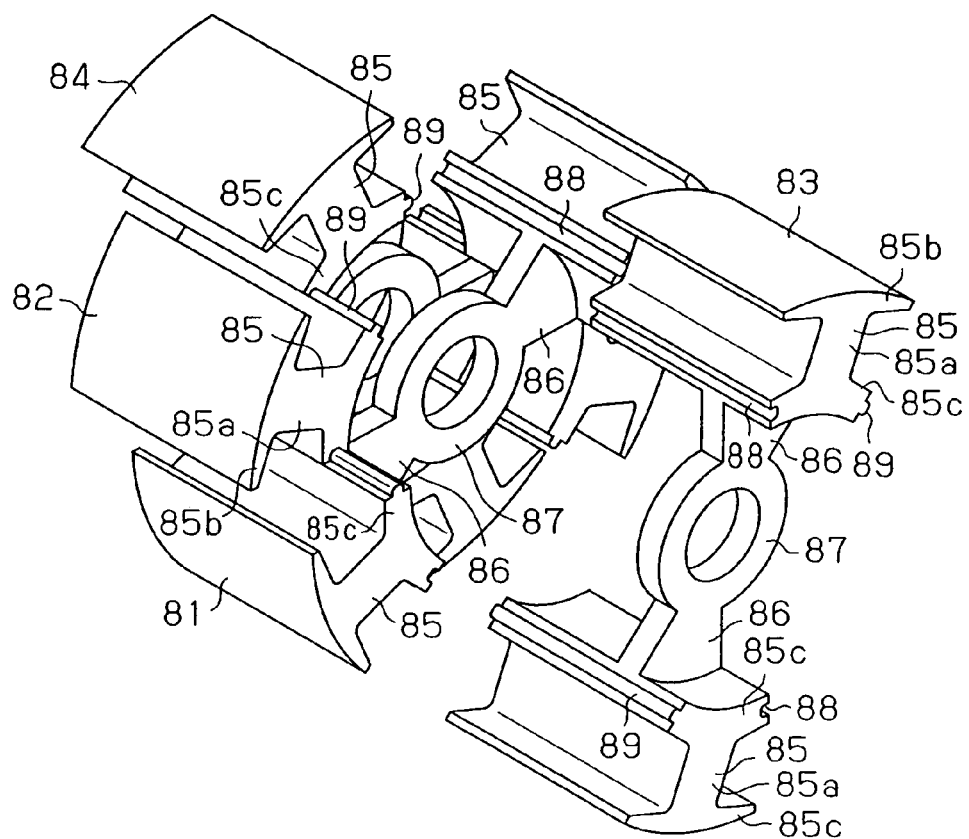
FIG. 32 is an exploded perspective view of the core of FIG. 31.
Figure 33:
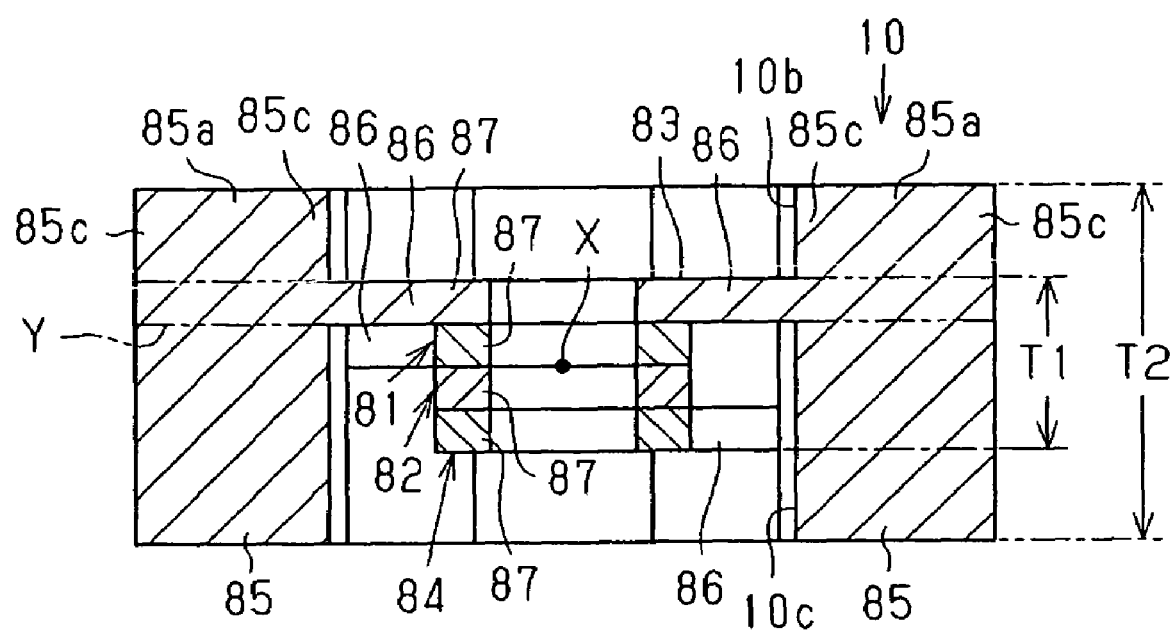
FIG. 33 is a cross-sectional view taken along line 33—33 of FIG. 31.

Next, a sixth embodiment of the present invention will be described. The present sixth embodiment modifies four split core members 20 constituting the core 10 of each of the above embodiments into four first to fourth split core members 81 to 84 as shown in FIGS. 31 to 33. That is, as shown in FIGS. 31 to 33, the core 10 of the present embodiment is formed by combining the first to fourth split core members 81 to 84 each having two teeth 85, and comprises a total of eight teeth 85. Each of the split core members 81 to 84 is formed of a plurality of stacked plate materials fixed by swaging, bonding, laser welding, or the like. A portion of the boundary line of the plate material to be stacked is shown by a two dot-chain line in FIG. 33.

Each of the split core members 81 to 84 has an annular portion 87, a pair of joining portions 86 extending from the annular portion 87 in a radial direction, and the pair of teeth 85 coupled with the outside end in a radial direction of the joining portion 86, respectively. The joining portions 86 and the annular portion 87 constitute a coupling member, and have a thickness smaller than the teeth 85 with respect to the axial direction of the core 10. Each joining portion 86 extends from a place other than either end in the axial direction of the tooth. In each of the split core members 81 to 84, the two teeth 85 and the two joining portions 86 are formed with the annular portion 87 as a center and spaced at angular intervals of 180 degrees. The joining portion 86 is formed substantially in the shape of a sector as viewed in the axial direction of the core 10. The annular portion 87 has its inner and outer peripheries formed in the shape of a perfect circle.

The position in the axial direction of the coupling members (86 and 87) for the teeth 85 is different for each split core member 81 to 84. In more detail, as shown in FIG. 33, the undersurfaces of the coupling members (86 and 87) of the first split core member 81, with respect to the axial direction of the same first split core member 81, match the center X in the axial direction of the corresponding teeth 85, that is, the middle of the thickness T2 in the axial direction of the teeth 85. The upper surfaces of the coupling members (86 and 87) of the second split core member 82, with respect to the axial direction of the same second split core member 82, match the venter X in the axial direction of the corresponding teeth 85. The undersurfaces of the coupling members (86 and 87) of the third split core member 83, with respect to the axial direction of the same third split core member 83, are positioned higher than the center X in the axial direction of the corresponding teeth 85 by the thickness of the coupling members (86 and 87) of the first split core member 81. The upper surfaces of the coupling members (86 and 87) of the third split core member 83, with respect to the axial direction of the same third split core member 83, are positioned lower than the upper end surfaces of the corresponding teeth 85. The upper surfaces of the coupling members (86 and 87) of the fourth split core member 84, with respect to the axial direction of the same fourth split core member 84, are positioned lower than the center X in the axial direction of the corresponding teeth 85 by the thickness of the coupling members (86 and 87) of the second split core member 82. The undersurfaces of the coupling members (86 and 87) of the fourth split core member 84, with respect to the axial direction of the same fourth split core member 84, are positioned higher than the lower end surface of the corresponding teeth 85.

The first to fourth split core members 81 to 84, viewed from below in FIG. 33, are assembled in order by the fourth split core member 84, the second split core member 82, the first split core member 81, and the third split core member 83. At this time, the annular portions 87 of the split core members 81 to 84 are stacked coaxially. Further, at this time, the joining portions 86 and the teeth 85 in order of the fourth split core member 84, the second split core member 82, the first split core member 81, and the third split core member 83 are displaced for each angle equivalent to the width in a circumferential direction of one tooth 85 around the axis of the annular portion 87, that is, for every 45 degrees (=360/8) (see FIGS. 31 and 32). As a result, a total of eight pieces of the teeth 85 are disposed at equal angular intervals, and at the same time, a plurality of joining portions 86 are disposed in a pattern of spiral stairs. Further, in a state in which the first to fourth split core members 81 to 84 are assembled, as shown in FIG. 33, the thickness T1 in the axial direction of a total of four coupling members (86 and 87) becomes smaller than the thickness T2 in the axial direction of the teeth 85. Hence, the core 10, in a place corresponding to the coupling members (86 and 87), has recesses 10b and 10c provided at both sides in the axial direction of the core 10.

Each tooth 85 comprises a pole portion 85a on which the coil 15 is wound, an umbrella portion 85b formed outside in a radial direction of the pole portion 85a, and a restricting portion 85c formed inside in a radial direction of the pole portion 85a The umbrella portion 85b, as shown in FIG. 31, extends to both sides in the circumferential direction from the outside end in a radial direction of the pole portion 85a, and performs the function of stopping of falling off from the outside in a radial direction of the coil 15. The restricting portion 85c, as shown in FIG. 31, extends from the inner end in a radial direction of the pole portion 85a to both sides in a circumferential direction so as to have angular range of 45 degrees. When four split core members 81 to 84 are assembled, the restricting portions 85c of the adjacent teeth 13 are allowed to abut against each other in the circumferential direction. The pole portion 85a, the umbrella portion 85b, and the restricting portion 85c have the same thickness T2 in the axial direction. The joining portion 86 extends from the restricting portion 85c to the annular portion 87 so as to have angular range of 45 degrees in a circumferential direction similarly to the restricting portion 85c.

Both end surfaces in a circumferential direction of each restricting portion 85c have an engaging recess 88 and an engaging projection 89, respectively. The engaging recess 88, in the one end surface in the circumferential direction in each restricting portion 85c, is formed so as to extend in the axial direction. When the first to fourth split core members 81 to 84 are assembled in the axial direction, the engaging recesses 88 and the engaging projections 89 of the restricting portions 85c are engaged.

The first to fourth split core members 81 to 84 are different only in positions in the axial direction of the joining portions 86 and the annular portion 87, and are constituted similarly otherwise. Bach of the split core members 81 to 84 is formed by stacking a plurality of plate materials. That is, by stacking plate material laminates Y (the plate material laminates in the range of the boundary line shown by a two dot chain line in FIG. 33) including the joining portion 86 and the annular portion 87, and a plurality of plate materials corresponding to the shape only of the teeth 85, each split core member 81 to 84 is formed. At this time, by just allowing the stacking positions of the plate material laminates Y to be different, four types of the split core members 81 to 84 different in an axial direction of the joining portions 86 and the annular portion 87 can be easily formed.

When the core 10 is constituted by assembling the first to fourth split core members 81 to 84 thus formed, as described above, the joining portions 86 are disposed in a pattern of spiral stairs. In this way, when the armature 3 rotates, an air flow is created by the joining portions 86 disposed in the pattern of spiral stairs, and temperature rise of the armature 3 can be suitably controlled.

Further, since the thickness T1 in the axial direction of a total of four coupling members (86 and 87) is smaller than the thickness T2 in the axial direction of the teeth 85, the recesses 10b and 10c (see FIG. 33) can be formed at a place corresponding to the coupling members (86 and 87) of the core 10. Hence, as can be understood from FIG. 2, portions of the setting portion 26 and the terminal 30 can be accommodated into the recess 10c, and at the same time, a bearing 12a can be accommodated into the recess 10c. Hence, miniaturization of size in the axial direction of the motor 1 is achieved.

The teeth 85 each have the restricting portion 85c, and when four split core members 81 to 84 are assembled, the restricting portions 85c of the adjacent teeth 85 mutually abut against each other in the circumferential direction. Hence, the relative movement of the split core members 81 to 84 in the circumferential direction is restricted. Moreover, both end surfaces in the circumferential direction of each restricting portion 85c have an engaging recess 88 and engaging projection 89, respectively. When the first to fourth split core members 81 to 84 are assembled, the engaging recesses 88 and the engaging projections 89 of the adjacent both restricting portions 85c are engaged. Hence, mutual relative movement and deformation in a radial direction of the split core members 81 to 84 caused by centrifugal force generated when the armature 3 rotates, is restricted.

Since each split core members 81 to 84 is formed of a plurality of stacked plate materials fixed, for example, by swaging, bonding, laser welding or the like. Since the split core members 81 to 84 can be easily produced by a punching process, the split core members 81 to 84 can be easily formed. Further, when the split core members 81 to 84 are formed of a plurality of stacked plate materials, eddy-current loss in the core 10 can be reduced.

Each of the above described embodiments may be modified as follows.

Before performing the spanning step, it is not always necessary to perform the first winding step. In this case, it is preferable that the conductive wire 15, of which one end portion is fastened to the outer protruded portion 24b of one of the teeth 13, is not wound about the tooth 13, but is pulled out from the inner engaging groove 25a of the tooth 13 and spanned up to the other tooth 13, thereby winding the conductive wire 15 on the tooth 13 to which side the conductive wire 15 spans. By so doing, the winding step can be completed at one time, and therefore, operating efficiency will be improved. Further, since the positions of both ends of the conductive wires 15 spanned between the two teeth 13 come to the same height with respect to the axial direction of the split core member 20, the terminal treatment of the conductive wires 15 inside in a radial direction of the teeth 13 can be stably performed.

In the first embodiment, the step shown in FIG. 11(a) may be omitted. In this case, in the fixing step shown in FIG. 11(b), when the terminal coupling unit 34 is fixed to the one bobbin 14 of each split core member 20, the crossed portion of the two conductive wires 15 extending between the two teeth 13 may be positioned between the terminal coupling unit 34 and the inner collar portion 25 of the one bobbin 14.

Although only one layer of the coils 15 is formed in the first winding step, a plurality of layers of the coils 15 may be formed.

The configuration of the core 10 is not limited to the configuration shown in the drawings, and, for example, the core 10 may be constituted by combining less than three or more than five split core members. Alternatively, an integral core may be used.

Although the motor of each of the above described embodiments is a motor, which is a six pole eight slot type motor, the motor may be a motor of another type. It is preferable that the number P of permanent magnets 5 be an even number equal to or more than four, and the number N of slots formed between the teeth 13 be P±2 (when P is 4, N is 6), and the number S of segments 17 provided in the commutator 11 be N×(P/2).

The angular intervals between the two teeth provided in the split core members may be other than an angular interval of 180 degrees.

The number of teeth provided in each split core member is not limited to two, but may be more than two.

The segments 17 does not need to short-circuited by using the short-circuit member assembly 40 as shown in the drawings, but may be short-circuited by spanning the conductive wire among a plurality of the segments.

Although several embodiments of the present invention have been described herein, it should be apparent to those skilled in the art that the present invention may be embodied in many other specific forms without departing from the spirit or scope of the invention. Particularly, the invention is not to be limited to the details given herein, but may be modified within the scope and equivalence of the appended claims.

What is claimed is:

1. A method for manufacturing an armature comprising a core constituted at least by assembling a plurality of split core members, each split core member having two teeth and a coupling member for coupling these teeth, said method comprising:
    winding a conductive wire on each of said teeth of each split core member to form on each tooth a first coil having a winding starting end and a winding finishing end;
    spanning said conductive wire from the winding finishing end of said first coil from each tooth to the other tooth;
    winding said conductive wire on the tooth to which the conductive wire is spanned to form on said first coil a second coil having a winding starting end and a winding finishing end;
    joining the winding starting end of the first coil and the winding finishing end of the second coil in each tooth so as to form a single coil on each tooth; and
    assembling a plurality of said split core members with each comprising the coils formed on the corresponding two teeth.

2. The method according to claim 1, wherein each first coil formed in said winding a conductive wire on each of said teeth has a single layer.

3. The method according to claim 1, wherein the winding direction of the conductive wire on each tooth is different from the other tooth.

4. The method according to claim 3, wherein the conductive wires are wound about the teeth by supplying the conductive wires to said teeth while rotating each split core member.

5. The method according to claim 3, wherein the two teeth of each split core member are a first tooth and a second tooth, wherein the conductive wire spanned from the first tooth to the second tooth and the conductive wire spanned from the second tooth to the first tooth are crossed in said spanning said conductive wire.

6. The method according to claim 1, wherein the winding direction of the conductive wire on each tooth is the same as the other tooth.

7. The method according to claim 6, wherein the two teeth of each split core member are a first tooth and a second tooth, wherein the conductive wire spanned from the first tooth to the second tooth and the conductive wire spanned from the second tooth to the first tooth extend in parallel in said spanning said conductive wire.

8. The method according to claim 1, wherein said winding a conductive wire on each of said teeth is started by winding the conductive wire from the outside to the inside in a radial direction of each tooth, and said winding said conductive wire on the tooth to which the conductive wire is spanned is ended by winding the conductive wire from the inside to the outside in a radial direction of each tooth.

9. The method according to claim 1, wherein the two teeth of each split core member is a first tooth and a second tooth, the method further comprising cutting the conductive wire spanned from the first tooth to the second tooth and the conductive wire spanned from the second tooth to the first tooth.

10. The method according to claim 9, wherein said armature has a commutator comprising a plurality of first contact portions, and a plurality of second contact portions held on said split core members such that each second contact portion corresponds to one of said teeth, said method further comprising:
    electrically connecting and fixing each spanned conductive wire to one of said second contact portions corresponding to one of the teeth prior to said cutting; and
    assembling said commutator on said core after said assembling a plurality of said split core members, wherein, when the commutator is assembled on said core, said first contact portions are electrically connected to said second contact portions.

11. The method according to claim 10, further comprising:
    holding a second contact portion coupling unit including said plurality of second contact portions mutually coupled on said split core member before said electrically connecting and fixing each spanned conductive wire; and
    splitting said second contact portion coupling unit into a plurality of second contact portions after said electrically connecting and fixing each spanned conductive wire.

12. The method according to claim, 1 further comprising:
    accommodating said armature into a stator comprising permanent magnets disposed so as to become alternately different poles in a circumferential direction;
    feeding power to the armature from an anode supply brush and a cathode supply brush;
    disposing the wire connection portions, which are formed in said joining the winding starting end of the first coil and the winding finishing end of the second coil, outside in a radial direction of said core, and, close to one end in an axial direction of said core; and
    inserting said armature into said stator such that said wire connection portions are positioned at the trailing side of the core with respect to the insertion direction of the armature for the stator.

13. The method according to claim 12, further comprising:
    setting the number P of said permanent magnets to an even number equal to or more than four;
    setting the number such that N of slots formed between said teeth to P±2 (N is six when P is four; and
    setting the number S of segments provided in the commutator to N×(P/2).

14. The method according to claim 13, further comprising:
    setting wherein the number P of said permanent magnets to six;
    setting the number N of said slots to eight; and
    setting the number of said segments to twenty-four.

15. A method for manufacturing an armature comprising a core constituted at least by assembling a plurality of split core members and a commutator assembled on the core, each split core member having two teeth and a coupling member for coupling these teeth, said commutator including a plurality of first contact portions, and wherein each split core member holds second contact portions such that each second contact portion corresponds to each of said teeth, said method comprising:

winding a conductive wire on each of said teeth of each split core member to form on each tooth a first coil having a winding starting end and a winding finishing end;

spanning said conductive wire extending from the winding finishing end of said first coil from each tooth to the other tooth;

winding said conductive wire on the tooth to which the conductive wire is spanned to form on said first coil a second coil having a winding starting end and a winding finishing end;

electrically connecting and fixing each spanned conductive wire to one of said second contact portions corresponding to one of said teeth after said winding said conductive wire on the tooth to which the conductive wire is spanned;

cutting the conductive wires spanned between the two teeth after said electrically connecting and fixing;

assembling a plurality of said split core members after said cutting the conductive wires;

assembling said commutator on said core after said assembling a plurality of said split core members, wherein, when the commutator is assembled on said core, said first contact portions are electrically connected to said second contact portions; and joining the winding staffing end of the first coil and the winding finishing end of the second coil so as to form a single coil in each tooth at least after said winding said conductive wire on the tooth to which the conductive wire is spanned.

16. The method according to claim 15, further comprising:

holding a second contact portion coupling unit including a plurality of said second contact portions mutually coupled on said split core member before said electrically connecting and fixing each spanned conductive wire; and splitting said second contact portion coupling unit into a plurality of second contact portions after said electrically connecting and fixing each spanned conductive wire.

* * * * *

UNITED STATES PATENT AND TRADEMARK OFFICE
CERTIFICATE OF CORRECTION

PATENT NO. : 7,188,403 B2  
APPLICATION NO. : 11/036198  
DATED : March 13, 2007  
INVENTOR(S) : Toshio Yamamoto et al.

It is certified that error appears in the above-identified patent and that said Letters Patent is hereby corrected as shown below:

On the fornt page of the page, under (73) Assignee:

Delete "Shikuoka-ken" and insert --Shizuoka-ken--

Signed and Sealed this

Twenty-first Day of August, 2007

JON W. DUDAS  
*Director of the United States Patent and Trademark Office*